(12) United States Patent
Yanase

(10) Patent No.: US 9,970,839 B2
(45) Date of Patent: May 15, 2018

(54) TIRE PRESSURE DECREASE DETECTION APPARATUS, METHOD, AND PROGRAM

(71) Applicant: SUMITOMO RUBBER INDUSTRIES, LTD., Kobe-shi, Hyogo (JP)

(72) Inventor: Minao Yanase, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 102 days.

(21) Appl. No.: 14/867,811

(22) Filed: Sep. 28, 2015

(65) Prior Publication Data

US 2016/0131547 A1 May 12, 2016

(30) Foreign Application Priority Data

Nov. 11, 2014 (JP) .................................. 2014-229076

(51) Int. Cl.
*G01L 17/00* (2006.01)
*G01P 3/00* (2006.01)
*B60C 23/06* (2006.01)

(52) U.S. Cl.
CPC ............ *G01L 17/00* (2013.01); *B60C 23/061* (2013.01); *B60C 23/062* (2013.01); *G01P 3/00* (2013.01)

(58) Field of Classification Search
CPC . B60C 23/061; B60C 23/062; B60C 23/0408; B60C 23/0416; Y02T 10/7275; B60G 17/0195

(Continued)

(56) References Cited

U.S. PATENT DOCUMENTS 5,878,365 A * 3/1999 Onogi ..................... B60T 8/172
303/146
6,591,668 B1 * 7/2003 Becherer ................ B60C 23/06
73/146

(Continued)

FOREIGN PATENT DOCUMENTS

EP   0 925 960 A2   6/1999
EP   2 130 693 A1   12/2009

(Continued)

OTHER PUBLICATIONS

Japanese Office Action for Japanese Application No. 2014-229076, dated Aug. 23, 2016.

(Continued)

*Primary Examiner* — Roy Y Yi
*Assistant Examiner* — Jeffrey Aiello
(74) *Attorney, Agent, or Firm* — Birch, Stewart, Kolasch & Birch, LLP

(57) ABSTRACT

A tire pressure decrease detection apparatus comprising a rotation speed information detection unit for detecting rotation speed information of wheels of a vehicle, a resonance frequency estimate unit for time-series estimating a torsional resonance frequency of the rotation speed information from the rotation speed information obtained by the rotation speed information detection unit, and a judgment unit for judging a decrease in pressure of tires installed in the wheels based on the estimated torsional resonance frequency. The resonance frequency estimate unit includes a noise removal unit for removing a noise superimposed on a wheel speed signal serving as the rotation speed information for each of the wheels with using an active noise control technology.

32 Claims, 19 Drawing Sheets

(58) Field of Classification Search
USPC ........... 73/114.04, 146, 146.2; 340/442, 444; 701/70; 702/138, 141, 148
See application file for complete search history.

(56) References Cited

U.S. PATENT DOCUMENTS

| | | |
|---|---|---|
| 2002/0059826 A1 | 5/2002 | Ono et al. |
| 2003/0080857 A1* | 5/2003 | Hartmann ............ B60C 23/061 340/425.5 |
| 2005/0184214 A1* | 8/2005 | Mizushima ............ F16F 13/26 248/638 |
| 2006/0276984 A1* | 12/2006 | Kobe ................... B60C 23/062 702/75 |
| 2006/0278022 A1* | 12/2006 | Ono ....................... B60T 8/171 73/862.322 |
| 2007/0139179 A1* | 6/2007 | Yanase ................. B60C 23/061 340/443 |
| 2008/0133081 A1* | 6/2008 | Colarelli ............ B60C 23/0408 701/29.2 |
| 2008/0292110 A1* | 11/2008 | Kobayashi ........... G10K 11/178 381/71.4 |
| 2013/0104640 A1* | 5/2013 | Gotschlich ........... B60C 23/062 73/146.5 |
| 2013/0180324 A1 | 7/2013 | Sota et al. |
| 2013/0184935 A1* | 7/2013 | Muragishi ............... F16F 15/02 701/37 |
| 2013/0259252 A1* | 10/2013 | Yasuda .................. G10K 11/16 381/71.11 |

FOREIGN PATENT DOCUMENTS

| | | |
|---|---|---|
| EP | 2 695 753 A2 | 2/2014 |
| EP | 2 700 514 A2 | 2/2014 |
| JP | 8-272378 A | 10/1996 |
| JP | 7-137509 A | 8/2003 |
| JP | 3435634 B2 | 8/2003 |
| JP | 2008-4150 A | 1/2008 |
| JP | 2014-35207 A | 2/2014 |

OTHER PUBLICATIONS

Extended European Search Report, dated Mar. 15, 2016, for European Application No. 15186610.0.
Umeno, "Tire Pressure Estimation Using Wheel Speed Sensors", R&D review of Toyota CRDL, vol. 32, No. 4, Dec. 1997, pp. 45-52.

* cited by examiner

1: WHEEL SPEED DETECTION UNIT
2: CONTROL UNIT
3: DISPLAY
4: INITIALIZATION BUTTON
5: ALARM

TIRE PRESSURE DECREASE DETECTION APPARATUS, METHOD, AND PROGRAM

TECHNICAL FIELD

The present invention relates to a tire pressure decrease detection apparatus, a method, and a program. Further in detail, the present invention relates to a tire pressure decrease detection apparatus, a method, and a program for detecting a decrease in pressure of tires based on a torsional resonance frequency of the tires of a traveling vehicle.

BACKGROUND ART

One of factors for letting an automobile safely travel includes pressure of a tire. When the pressure is decreased to less than a proper value, operating stability and fuel consumption are deteriorated, so that a tire burst may sometimes be caused. Therefore, a tire pressure monitoring system (TPMS) for detecting a decrease in tire pressure and issuing an alarm so as to urge a driver to take a proper action is an important technique from a view of protecting an environment and ensuring safety of the driver.

The conventional monitoring system can be classified into two types including a direct detection type and an indirect detection type. The direct detection type is to directly measure the pressure of the tire by incorporating pressure sensors inside a tire wheel. Although the decrease in the pressure can be detected with high precision, some disadvantages in terms of technique and cost remain, the disadvantages including problems in battery life, maintenance, and fault tolerance in an actual environment.

Meanwhile, the indirect detection type is a method for estimating the pressure from rotation information of the tire, and can be finely classified into a Dynamic Loaded Radius (DLR) method and a Resonance Frequency Mechanism (RFM) method. Among them, the RFM method can solve problems in the DLR method (problems such as incapability of detecting four-wheel simultaneous under-inflation due to the basic principle that rotation speed is relatively compared among wheels), and various techniques are proposed.

The RFM method utilizes a characteristic that a torsional resonance frequency of the tire is lowered by the under-inflation and time-series estimates the torsional resonance frequency of the tire from rotation speed information or rotation acceleration information of the tire so as to detect the decrease in the pressure of the tire.

However, at the time of estimating the resonance frequency of the tire in the RFM method, when there is a peak caused by a noise in the vicinity of a tire resonance frequency in a wheel speed spectrum, estimate precision of the resonance frequency is lowered. For example, when a periodic noise represented by an engine noise is superimposed on the vicinity of the resonance frequency of the tire, the estimate precision of the resonance frequency is largely influenced.

A major cause of the engine noise is rotation unevenness and torque unevenness of the engine. Thus, in general, the engine noise appears in left and right wheels of driving wheels in the same phase. In order to eliminate such an influence of the noise of the same phase, obtainment of a difference in wheel speed between the left and right wheels is proposed (for example, refer to Patent Literature 1 and Non-Patent Literature 1). In tire pressure estimate methods described in Patent Literature 1 and Non-Patent Literature 1, in consideration with the fact that the above engine noise appears in left and right wheels in the same phase, a difference in wheel speed between the left and right wheels is obtained for removing the engine noise.

Cancellation of a noise by subjecting wheel speed signals to FFT processing, smoothing a spectrum by averaging processing or the like, and cutting off a peak caused by the noise is proposed (for example, refer to Patent Literature 2).

CITATION LIST

Patent Literature

Patent Literature 1: Japanese Patent No. 3435634
Patent Literature 2: Japanese Unexamined Patent Publication No. 7-137509

Non-Patent Literature

Non-Patent Literature 1: Koji Umeno, (December 1997) "Tire Pressure Estimation Using Wheel Speed Sensors" R&D review of Toyota CRDL, Vol. 32, No. 4, pp 45-52.

SUMMARY OF INVENTION

Technical Problem

However, in the method of obtaining the difference between the left and right wheels as in the techniques described in Patent Literature 1 and Non-Patent Literature 1, even when subtraction is performed between the wheel speed signals of the left and right wheels, the engine noise may not be removed. That is, this is because a characteristic of transmission from a differential gear to the tire may be different between the left and the right due to unequal length of an axle shaft between the left and the right which is frequently seen in a FF vehicle, a rigidity difference between the left and the right, a characteristic difference between the left and right tires, or the like.

An indirect type pressure decrease detection device as in the device described in Patent Literature 2 is generally incorporated in a CPU such as an ABS mounted in a vehicle. However, in this case, frequent use of FFT is problematic in terms of CPU resources.

The present invention has been made in view of the above circumstances, and an objective thereof is to provide a tire pressure decrease detection apparatus, a method, and a program capable of eliminating an influence of a periodic noise and improving estimate precision of a tire resonance frequency.

Solution to Problem (1) A tire pressure decrease detection apparatus (hereinafter, also simply referred to as the "detection apparatus") according to a first aspect of the present invention includes:
a rotation speed information detection unit for detecting rotation speed information of wheels of a vehicle;
a resonance frequency estimate unit for time-series estimating a torsional resonance frequency of the rotation speed information from the rotation speed information obtained by the rotation speed information detection unit; and
a judgment unit for judging a decrease in pressure of tires installed in the wheels based on the estimated torsional resonance frequency,
wherein the resonance frequency estimate unit includes a noise removal unit for removing a noise superimposed on a wheel speed signal serving as the rotation speed information for each of the wheels with using an active noise control technology.

(2) A detection apparatus according to a second aspect of the present invention includes:

a rotation speed information detection unit for detecting rotation speed information of wheels of a vehicle;

a rotation acceleration information calculation unit for calculating rotation acceleration information of the wheels from the rotation speed information obtained by the rotation speed information detection unit;

a resonance frequency estimate unit for time-series estimating a torsional resonance frequency of the rotation acceleration information from the rotation acceleration information calculated by the rotation acceleration information calculation unit; and a judgment unit for judging a decrease in pressure of the tires based on the estimated torsional resonance frequency, wherein the resonance frequency estimate unit includes a noise removal unit for removing a noise superimposed on a wheel acceleration signal serving as the rotation acceleration information for each of the wheels with using an active noise control technology.

With the detection apparatus of the present invention, by using the active noise control technology (hereinafter, also simply referred to as the "ANC technology"), a periodic noise superimposed on the wheel speed signal or the wheel acceleration signal can be removed for each of the wheels. As a result, estimate precision of the torsional resonance frequency of the tire can be improved. Since the ANC technology used here is a technology not using FFT, not much CPU resources are required. Thus, the technology can be easily installed in a general in-vehicle computer.

(3) In the above detection apparatus of (1) or (2), the active noise control technology can be a delayed-x harmonics synthesizer (DXHS).

(4) In the above detection apparatus of (3), the noise is a periodic noise caused by an explosion of an engine, a frequency of the periodic noise can be calculated from the engine rotation number and the cylinder number, and the noise removal unit functions in a case where the calculated frequency is within a range from 25 to 65 Hz.

(5) In the above detection apparatus of (1) or (2), the active noise control technology can be an FIR type adaptive digital filter using a past signal of the wheel speed signal or the wheel acceleration signal serving as an object to be controlled as a reference signal, and an LMS algorithm as an adaptive algorithm.

(6) In the above detection apparatus of (3), desirably, the noise removal unit functions at vehicle speed of 30 to 120 kph, and a calculation cycle of the noise removal unit is 3 to 10 msec.

(7) In the above detection apparatus of (5), desirably, a formula of K×4≤N≤50 is satisfied when the tap number of the FIR type adaptive digital filter is N and the number of the noise to be removed is K.

(8) In the above detection apparatus of (5), desirably, a time difference Δt (sec) between an acquired time of the past signal used as the reference signal and a current time satisfies a formula of 0.16≤Δt≤0.35.

(9) In the above detection apparatus of (1) or (2), the active noise control technology can be an FIR type adaptive digital filter using a wheel speed signal or a wheel acceleration signal of the other wheel on the same axle as the wheel of which an engine noise is to be removed as a reference signal, and an LMS algorithm as an adaptive algorithm.

(10) In the above detection apparatus of (1) or (2), the active noise control technology can be an FIR type adaptive digital filter using a wheel speed signal or a wheel acceleration signal of the other wheel on the same side as the wheel of which a periodic road surface noise is to be removed as a reference signal, and an LMS algorithm as an adaptive algorithm.

(11) In the above detection apparatus of (9), desirably, a time difference Δt (sec) between an acquired time of the signal used as the reference signal and a current time satisfies a formula of 0≤Δt≤0.35, in which "acquired time of reference signal"="current time"−Δt.

(12) In the above detection apparatus of (10), desirably, a time difference Δt (sec) between an acquired time of the signal used as the reference signal and a current time is 0≤Δt≤wheelbase (m)/vehicle speed (m/sec)×3, in which "acquired time of reference signal"="current time"−Δt in a case where a rear wheel is controlled with a front wheel as the reference signal, and "acquired time of reference signal"="current time"+Δt in a case where the front wheel is controlled with the rear wheel as the reference signal.

(13) A tire pressure decrease detection method (hereinafter, also simply referred to as the "detection method") according to a third aspect of the present invention includes:

a rotation speed information detection step for detecting rotation speed information of wheels of a vehicle;

a resonance frequency estimate step for time-series estimating a torsional resonance frequency of the rotation speed information from the rotation speed information obtained in the rotation speed information detection step; and a judgment step for judging a decrease in pressure of tires installed in the wheels based on the estimated torsional resonance frequency, wherein the resonance frequency estimate step includes a noise removal step for removing a noise superimposed on a wheel speed signal serving as the rotation speed information for each of the wheels with using an active noise control technology.

(14) A detection method according to a fourth aspect of the present invention includes:

a rotation speed information detection step for detecting rotation speed information of wheels of a vehicle;

a rotation acceleration information calculation step for calculating rotation acceleration information of the wheels from the rotation speed information obtained in the rotation speed information detection step;

a resonance frequency estimate step for time-series estimating a torsional resonance frequency of the rotation acceleration information from the rotation acceleration information calculated in the rotation acceleration information calculation step; and a judgment step for judging a decrease in pressure of the tires based on the estimated torsional resonance frequency, wherein the resonance frequency estimate step includes a noise removal step for removing a noise superimposed on a wheel acceleration signal serving as the rotation acceleration information for each of the wheels with using an active noise control technology.

With the detection method of the present invention, by using the ANC technology, the periodic noise superimposed on the wheel speed signal or the wheel acceleration signal can be removed for each of the wheels. As a result, estimate precision of the torsional resonance frequency of the tire can be improved. Since the ANC technology used here is a technology not using FFT, not much CPU resources are required. Thus, the technology can be easily installed in a general in-vehicle computer.

(15) In the above detection method of (13) or (14), the active noise control technology can be an FIR type adaptive digital filter using a past signal of the wheel speed signal or the wheel acceleration signal serving as an object to be controlled as a reference signal, and an LMS algorithm as an adaptive algorithm.

(16) In the above detection method of (15), desirably, a formula of K×4≤N≤50 is satisfied when the tap number of the FIR type adaptive digital filter is N and the number of the noise to be removed is K.

(17) In the above detection method of (15), desirably, a time difference Δt (sec) between an acquired time of the past signal used as the reference signal and a current time satisfies a formula of 0.16≤Δt≤0.35.

(18) A tire pressure decrease detection program (hereinafter, also simply referred to as the "program") according to a fifth aspect of the present invention which causes a computer, for detecting a decrease in pressure of tires based on a resonance frequency of the tires of a traveling vehicle, to function as:

a resonance frequency estimate unit for time-series estimating a torsional resonance frequency of rotation speed information from the rotation speed information obtained by a rotation speed information detection unit for detecting the rotation speed information of wheels of the vehicle, and a judgment unit for judging the decrease in the pressure of the tires installed in the wheels based on the estimated torsional resonance frequency, wherein the resonance frequency estimate unit includes a noise removal unit for removing a noise superimposed on a wheel speed signal serving as the rotation speed information for each of the wheels with using an active noise control technology.

(19) A program according to a sixth aspect of the present invention which causes a computer, for detecting a decrease in pressure of tires based on a resonance frequency of the tires of a traveling vehicle, to function as:

a rotation acceleration information calculation unit for calculating rotation acceleration information of wheels from rotation speed information obtained by a rotation speed information detection unit for detecting the rotation speed information of the wheels of the vehicle, a resonance frequency estimate unit for time-series estimating a torsional resonance frequency of the rotation acceleration information from the rotation acceleration information calculated by the rotation acceleration information calculation unit, and a judgment unit for judging the decrease in the pressure of the tires based on the estimated torsional resonance frequency, wherein the resonance frequency estimate unit includes a noise removal unit for removing a noise superimposed on a wheel acceleration signal serving as the rotation acceleration information for each of the wheels with using an active noise control technology.

Advantageous Effects of Invention

According to the tire pressure decrease detection device, the method, and the program of the present invention, the influence of the periodic noise can be eliminated and the estimate precision of the tire resonance frequency can be improved.

DESCRIPTION OF EMBODIMENTS

Hereinafter, with reference to the attached drawings, embodiments of a detection apparatus, a method, and a program of the present invention will be described in detail. It should be noted that the present invention is not limited to these examples but indicated by the claims, and is intended to include equivalent meanings to the claims and all modifications within the scope of the claims.

Figure 1:
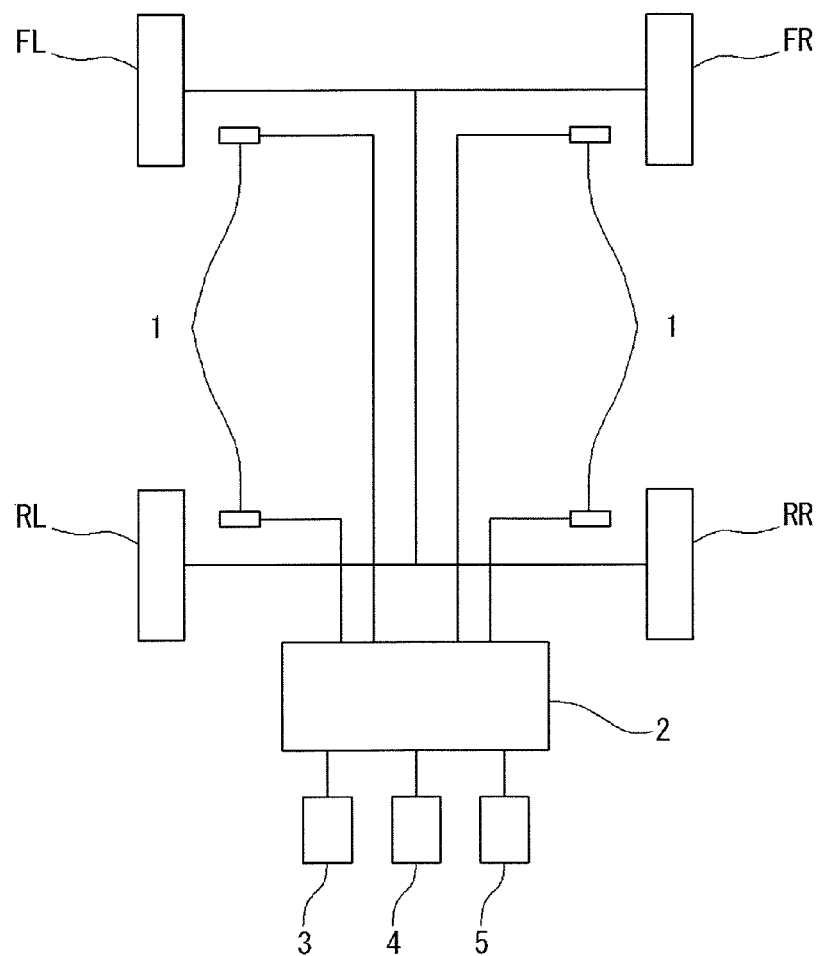
FIG. 1 is a block diagram showing one embodiment of a detection apparatus of the present invention.

FIG. 1 is a block diagram showing a detection apparatus according to one embodiment of the present invention. FIG.

2 is a block diagram showing an electric configuration of the detection apparatus shown in FIG. 1.

As shown in FIG. 1, the detection apparatus according to one embodiment of the present invention includes a general wheel speed detection unit (rotation speed information detection unit) 1 provided in relation to each of wheels in order to detect rotation speed information of a left front wheel (FL), a right front wheel (FR), a left rear wheel (RL), and a right rear wheel (RR) of a four-wheeled vehicle.

As the wheel speed detection unit 1, there can be used a wheel speed sensor for generating a rotation pulse with using an electromagnetic pickup or the like so as to measure rotation angular speed and wheel speed from the number of the pulse and a pulse interval (sec), an angular speed sensor including a sensor for generating electric power with utilizing rotation like a dynamo so as to measure the rotation angular speed and the wheel speed from voltage thereof, or the like. An output of the wheel speed detection unit 1 is given to a control unit 2 serving as a computer such as an ABS. Connected to this control unit 2 are a display 3 formed by a liquid crystal display element, a plasma display element, a CRT, or the like for displaying depressurization of tires for example, an initialization button 4 capable of being operated by a driver, and an alarm 5 for notifying the driver of the depressurization of the tires.

Figure 2:
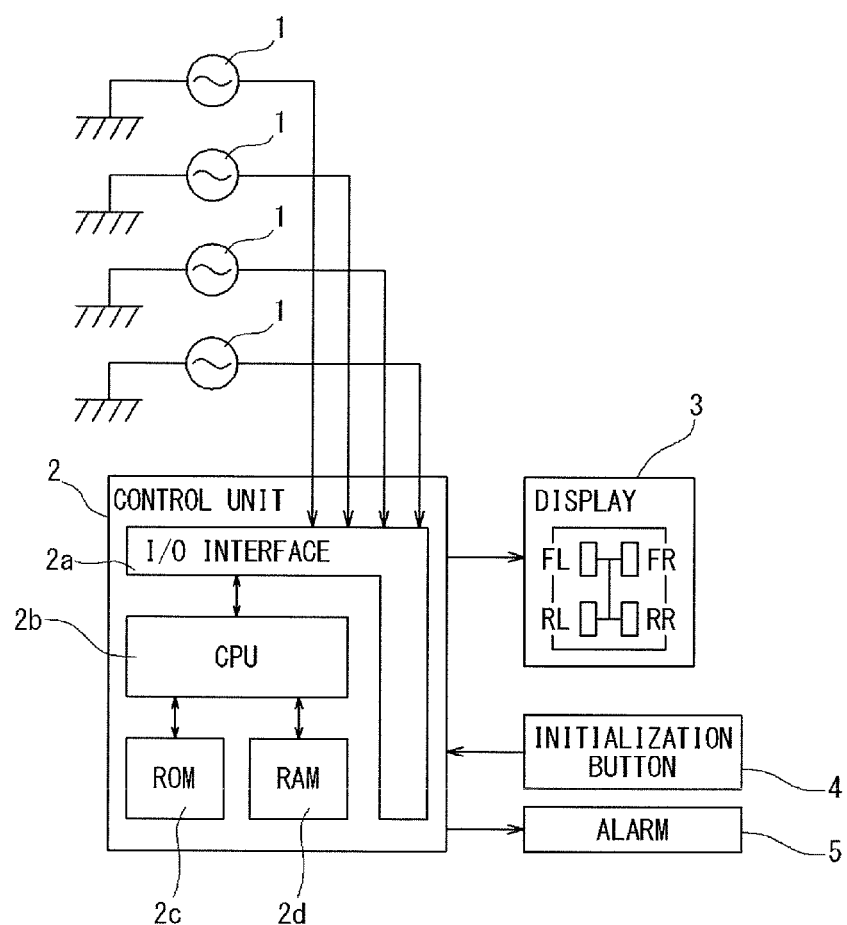
FIG. 2 is a block diagram showing an electric configuration of the detection apparatus shown in FIG. 1.

As shown in FIG. 2, the control unit 2 is composed of an I/O interface 2a required for sending and receiving signals to and from an external device, a CPU 2b functioning as a center of arithmetic processing, a ROM 2c in which a control operation program of the CPU 2b is stored, and a RAM 2d in which data and the like are temporarily written and the written data is read out when the CPU 2b performs control operation.

In the wheel speed detection unit 1, a pulse signal corresponding to the rotation number of the tire (hereinafter, also referred to as the "wheel speed pulse") is outputted, and time series data of wheel speed signals can be obtained. Since a resonance frequency in the torsional direction of the focused tire appears in the vicinity of tens of Hz, there is a need for setting a sampling cycle in such a manner that the resonance frequency is included in the Nyquist frequency.

The detection apparatus according to the present embodiment mainly includes the wheel speed detection unit (rotation speed information detection unit) 1, a resonance frequency estimate unit for time-series estimating a torsional resonance frequency of the rotation speed information from the rotation speed information obtained by the wheel speed detection unit 1, and a judgment unit for judging a decrease in pressure of the tires installed in the wheels based on the estimated torsional resonance frequency. The resonance frequency estimate unit includes a noise removal unit for removing a noise superimposed on a wheel speed signal serving as the rotation speed information for each of the wheels by using an ANC technology. The program according to the present embodiment is installed in the control unit 2 and causes the control unit 2 to function as the resonance frequency estimate unit including the noise removal unit, and the judgment unit.

The torsional resonance frequency can be estimated, for example, by performing a time series analysis to the rotation speed information or rotation acceleration information based on the secondary autoregressive (AR) model, or by timesseries estimating a parameter as an n-th (n is an integer of three or more) linear model of the following expression (1) with the rotation acceleration information as a time-series signal as disclosed in Japanese Unexamined Patent Publication No. 2011-102077. In the expression (1), the reference sign y(k) denotes a time-series signal of wheel rotation acceleration, the reference sign n denotes a model order (integer of three or more), the reference sign $a_i$ denotes the parameter, and the reference sign w(k) denotes a disturbance.

$$y(k) = \sum_{i=1}^{n} a_i y(k-i) + w(k) \quad (1)$$

When the obtained torsional resonance frequency becomes smaller than for example a reference torsional resonance frequency calculated at the time of initialization and stored in the RAM 2d and goes below a predetermined threshold value (such as 2 Hz), it is judged that the tire is depressurized and the alarm 5 issues an alarm.

The present invention is to remove a periodic noise at the time of judging the decrease in the tire pressure focusing on a change in the torsional resonance frequency, in consideration with the fact that the periodic noise is generated in the vicinity of the torsional resonance frequency of the tires due to rotation unevenness and torque unevenness of an engine and there is a fear that an erroneous report or non-alarm is caused because of this. At that time, in the present invention, the periodic noise is removed for each of the wheels of the vehicle with using the ANC technology. Hereinafter, a utilization mode of such an ANC technology will be described.

First Embodiment

In the present embodiment, as the ANC technology, a delayed-x harmonics synthesizer (DXHS) which is an algorithm specialized in removal of a periodic noise such as an engine noise caused by an explosion of the engine is used.

A frequency of the engine noise can be calculated from the engine rotation number serving as engine rotation number information and the cylinder number. In the present embodiment, the noise removal unit functions in a case where the calculated frequency is within a ranged from 25 to 65 Hz. Since a tire torsional resonance in the vicinity of 40 Hz is intended in the RFM method which is a premise of the detection apparatus or the method according to the present embodiment, an influence of a noise at a frequency less than 25 Hz or exceeding 65 Hz is not easily exerted. Thus, there is no need for removing such a noise.

In terms of calculation precision, calculation speed, and easiness of specifying of a resonance peak, the ANC desirably functions at vehicle speed of 30 to 120 kph. Since calculation resources are restricted, a calculation cycle of the ANC is desirably 3 to 10 msec.

Figure 3:
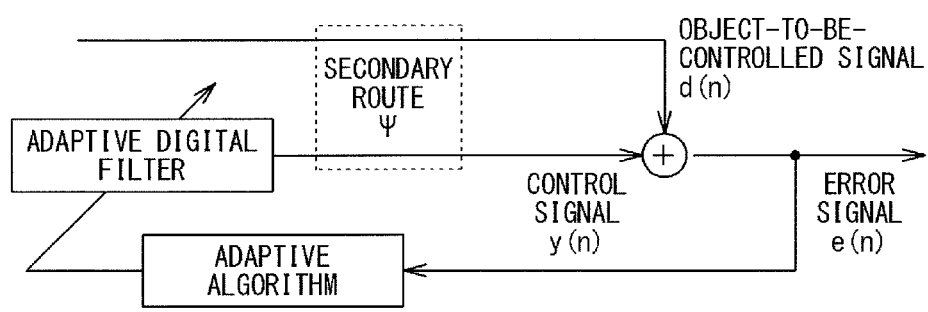
FIG. 3 is a chart showing a system flow of a DXHS.

FIG. 3 is a chart showing a system flow of the DXHS. In the system flow, if there is no secondary route and an object-to-be-controlled signal (=d(n)) is a periodic noise, the signal d(n) is expressed as:

$d(n)=\alpha(n)\cdot\cos(\omega)(n)\cdot n-T)+\beta(n)\cdot\sin(\omega(n)\cdot n\cdot T)$.

Meanwhile, based on this, a control signal (=y(n)) is expressed as:

$y(n)=\hat{\alpha}(n)\cdot\cos(\hat{\omega}(n)\cdot n\cdot T)+\hat{\beta}(n)\cdot\sin(\hat{\omega}(n)\cdot n\cdot T)$ That is, the noise (=d(n)) is a sinusoidal wave (periodic noise) having a gain, a phase, and a frequency determined by $\alpha(n)$, $\beta(n)$, and $\omega(n)$. The "DXHS" cancels this noise by adding a sinusoidal wave (=y(n)) having the same gain as and the opposite phase to the noise.

$\hat{\alpha}(n), \hat{\beta}(n),$ and $\hat{\omega}(n)$ are adaptively updated so as to minimize the error function:

$$J=e^2(n) \text{ (here, } e(n)=d(n)+y(n)\text{).}$$

Update expressions are as follows:

$$\hat{\alpha}(n+1)=\hat{\alpha}(n)-2\cdot\mu\cdot e(n)\cdot\cos(\hat{\Omega}(n))$$

$$\hat{\beta}(n+1)=\hat{\beta}(n)-2\cdot\mu\cdot e(n)\cdot\sin(\hat{\Omega}(n))$$

$$\hat{\omega}(n+1)=\hat{\omega}(n)-2\cdot\mu_\omega\cdot n\cdot T\cdot e(n)\cdot[\hat{\beta}(n)\cdot\cos(\hat{\Omega}(n))-\hat{\alpha}(n)\cdot\sin(\hat{\Omega}(n))]$$

wherein:

$$\hat{\omega}_k(n)\cdot n\cdot T=\hat{\Omega}_k(n)=\hat{\Omega}_k(n-1)+\hat{\omega}_k(n-1)\cdot T$$

Second Embodiment

In the present embodiment, the ANC technology is an FIR type adaptive digital filter using a past signal of the wheel speed signal or a wheel acceleration signal serving as an object to be controlled as a reference signal, and an LMS algorithm as an adaptive algorithm. That is, in the present embodiment, the object-to-be-controlled signal and the reference signal are the same as each other.

Firstly, for reference, a case where the object-to-be-controlled signal (=d(n)) and the reference signal (=noise source x(n)) are different from each other will be described.

Figure 4:
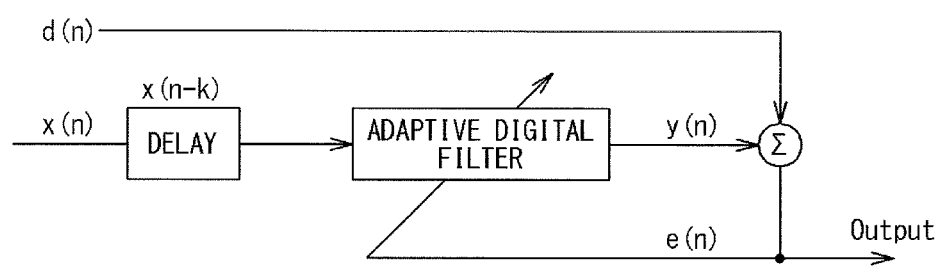
FIG. 4 is a chart showing a system flow in a case where an object-to-be-controlled signal (=d(n)) and a reference signal (=noise source x(n)) are different from each other.

FIG. 4 is a chart showing a system flow in a case where the object-to-be-controlled signal (=d(n)) and the reference signal (=noise source x(n)) are different from each other. In this case, the control signal (=y(n)) and an error signal (=e(n)) are expressed by the following expressions (2) and (3), and a filter coefficient vector (=h(k, n)) is updated in accordance with the following expression (4).

$$y(n) = \sum_{k=0}^{N_h-1} h(k, n)\cdot x(n-k) \quad (2)$$

$$e(n) = d(n) + y(n) \quad (3)$$

$$h(k, n+1) = h(k, n) - 2\cdot\mu\cdot e(n)\cdot x(n-k) \quad (4)$$

The object-to-be-controlled signal including the noise and the reference signal are denoted by d(n) and x(n) respectively, and the tap number and step size are denoted by $N_h$ and μ respectively.

In general, as shown in the system flow of FIG. 4, in a case where the reference signal (which is the noise source and the signal correlated to the noise=x(n)) can be obtained differently from the object-to-be-controlled signal (=d(n)) including the noise, the FIR type adaptive digital filter is formed with using such a reference signal, and by adding to the object-to-be-controlled signal (=d(n)), a signal (=noise) correlated to the reference signal can be canceled.

However, the present embodiment is an embodiment on the premise that there is not such a reference signal (=noise source).

In a case where there is no noise source other than the periodic noise to be removed in the present invention and the reference signal as described above cannot be obtained, by making the past object-to-be-controlled signal the "reference signal," a signal correlated to the past signal, that is a noise to be removed can be canceled.

The periodic noise such as the engine noise included in the wheel speed signal is correlated to the past signal of the wheel speed signal. Therefore, by making the past signal the reference signal, the periodic noise can be canceled. A torsional resonance of the tire utilized for detecting the depressurization of the tire is a random signal and is not correlated to the past signal. Thus, even when the noise is removed by the present embodiment, the torsional resonance signal is not influenced.

Figure 5:
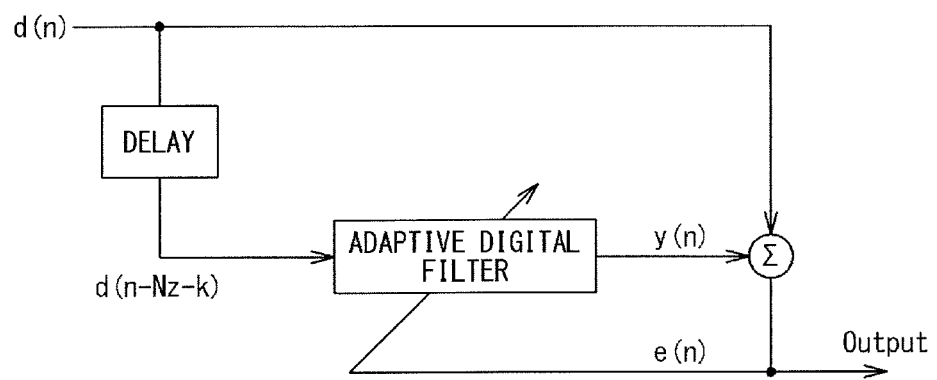
FIG. 5 is a chart showing a system flow in a case where the object-to-be-controlled signal and the reference signal are the same as each other.
Figure 6A:
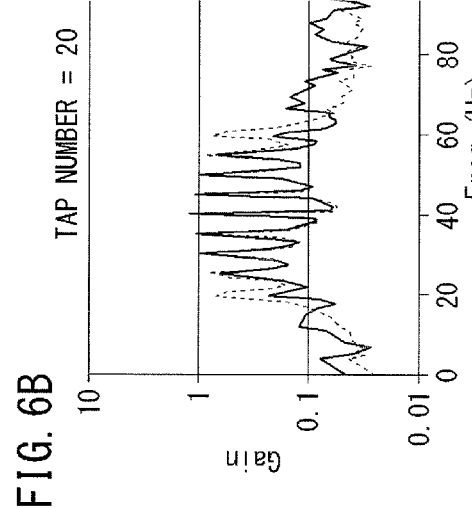
FIGS. 6A to 6D are graphs showing a noise cancellation performance when the tap number is changed in a case of the noise number of 9.
Figure 6B:
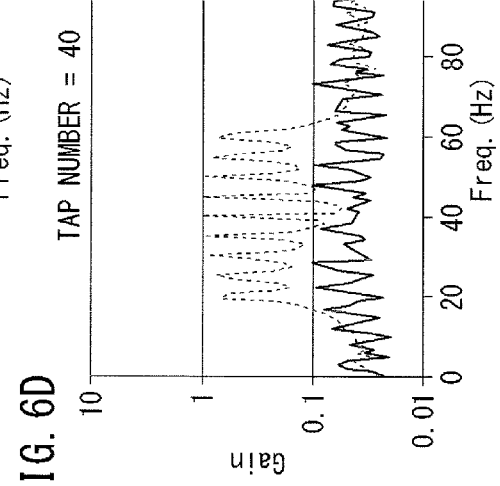
Figure 6C:
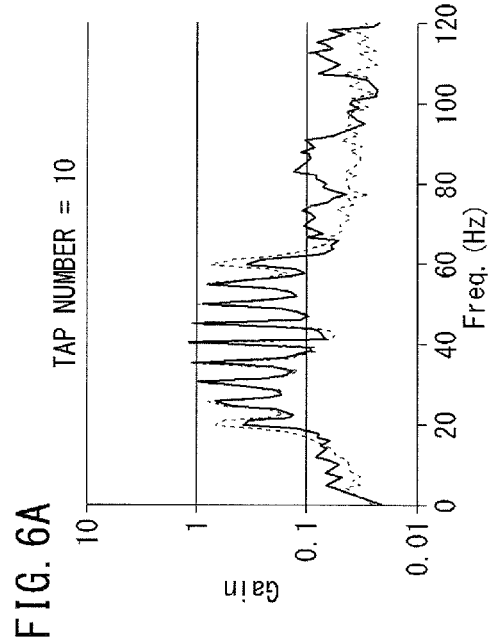
Figure 6D:
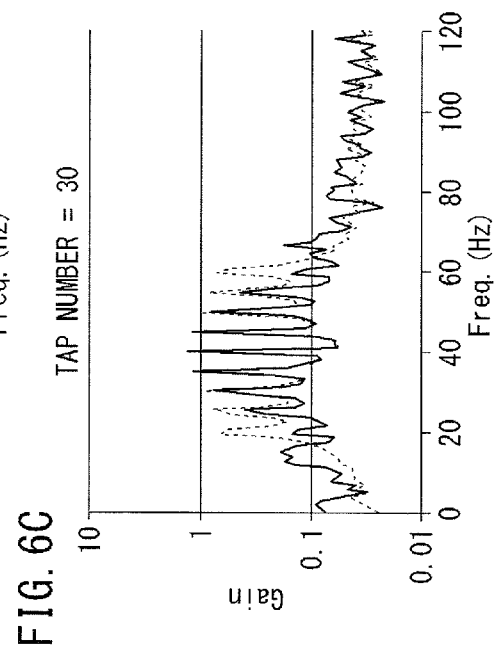
Figure 7A:
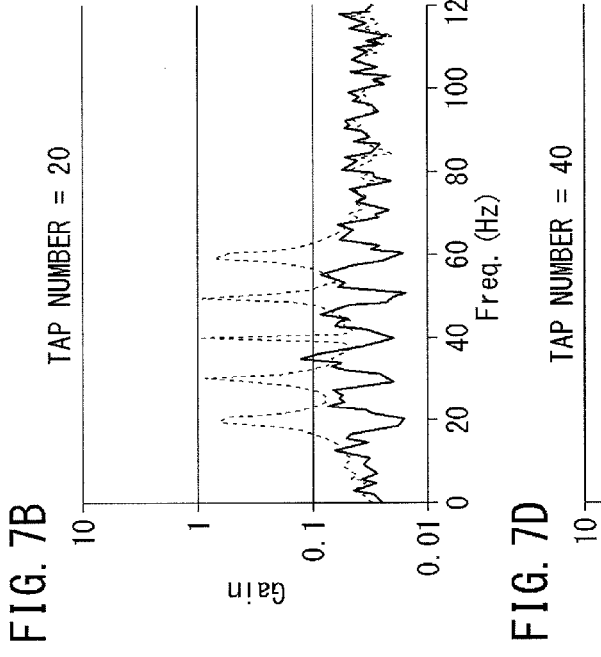
FIGS. 7A to 7D are graphs showing a noise cancellation performance when the tap number is changed in a case of the noise number of 5.
Figure 7B:
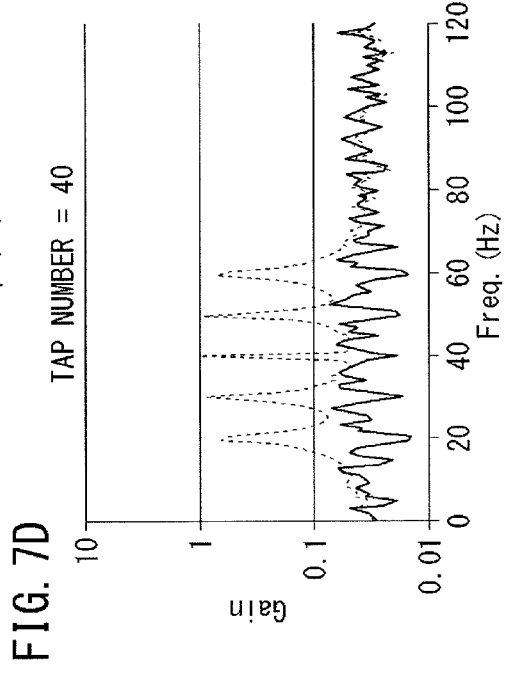
Figure 7C:
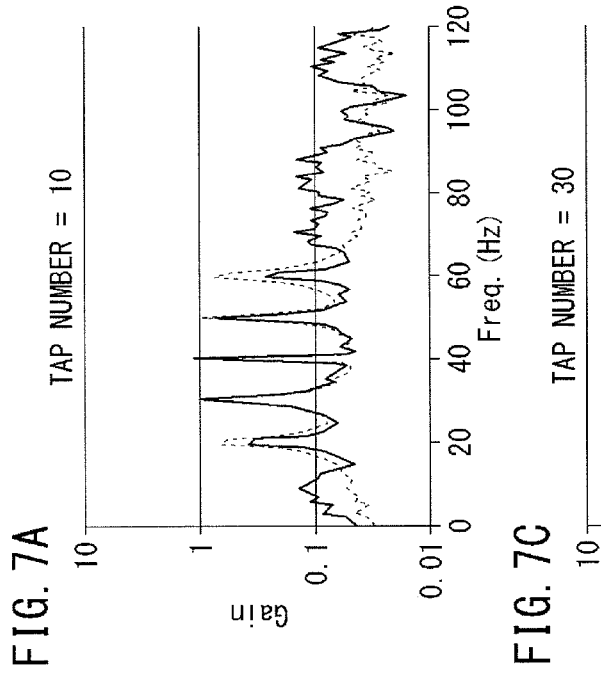
Figure 7D:
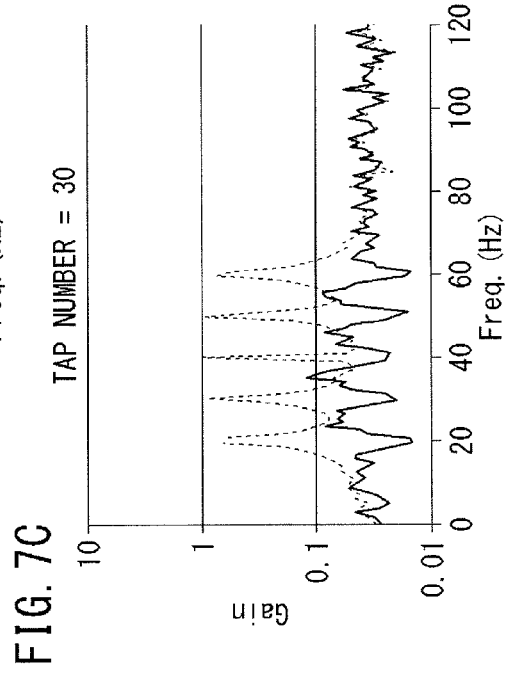
Figure 8A:
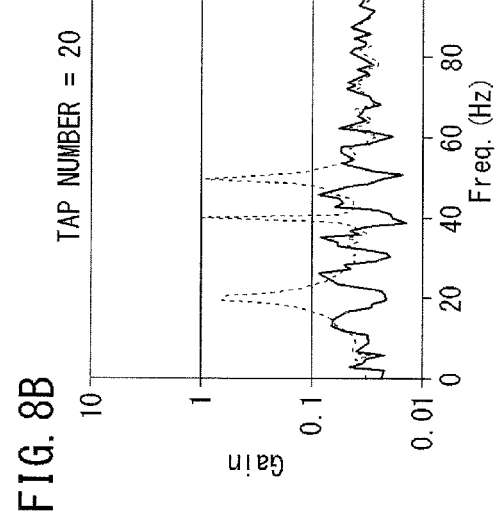
FIGS. 8A to 8D are graphs showing a noise cancellation performance when the tap number is changed in a case of the noise number of 3.
Figure 8B:
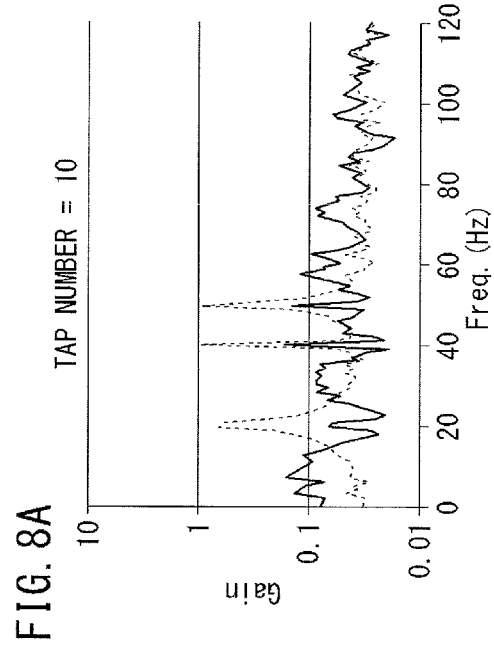
Figure 8C:
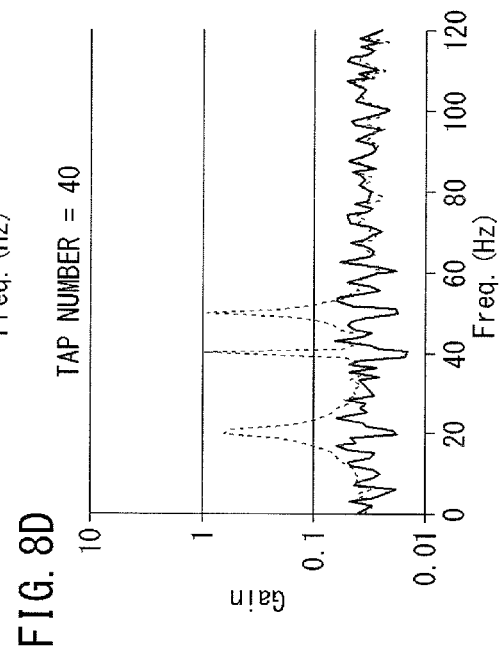
Figure 8D:
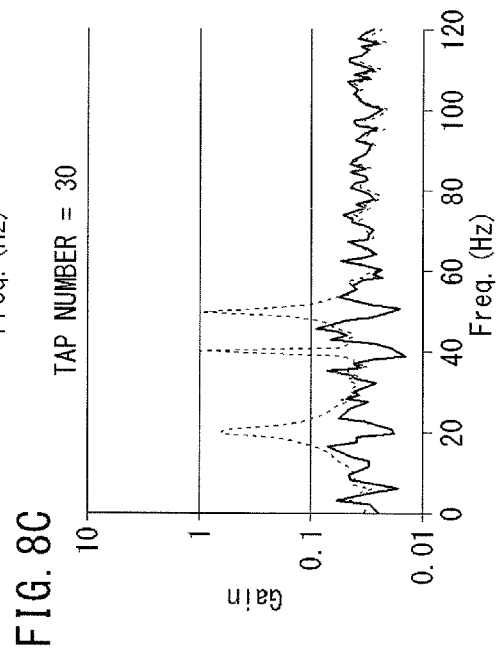
Figure 9A:
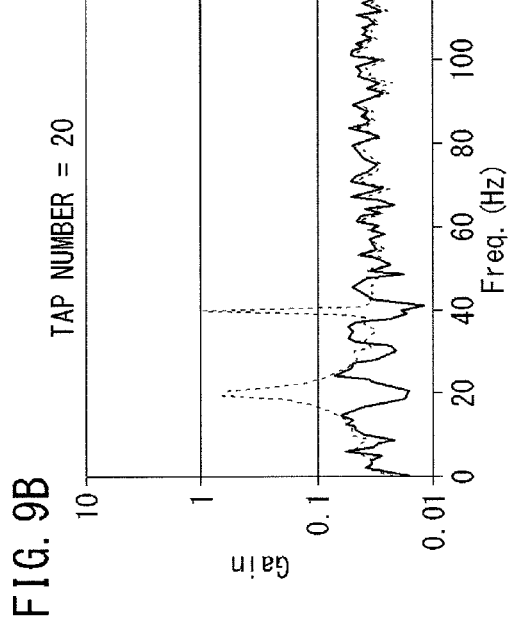
FIGS. 9A to 9D are graphs showing a noise cancellation performance when the tap number is changed in a case of the noise number of 2.
Figure 9B:
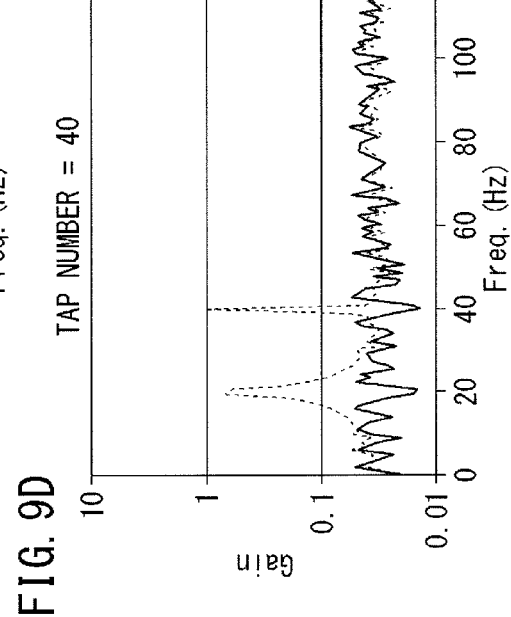
Figure 9C:
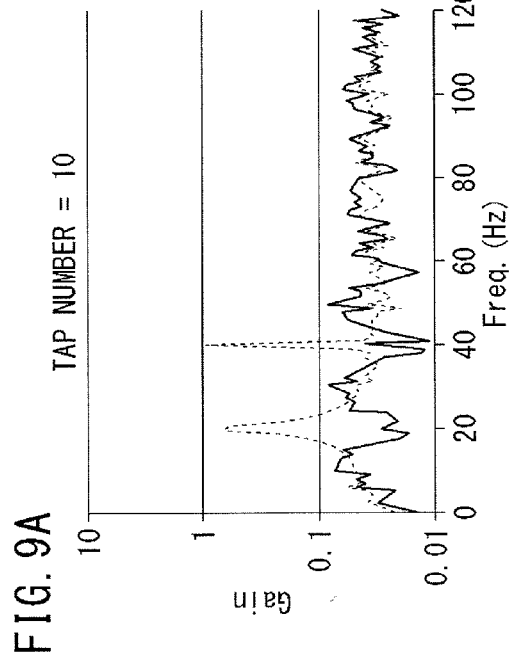
Figure 9D:
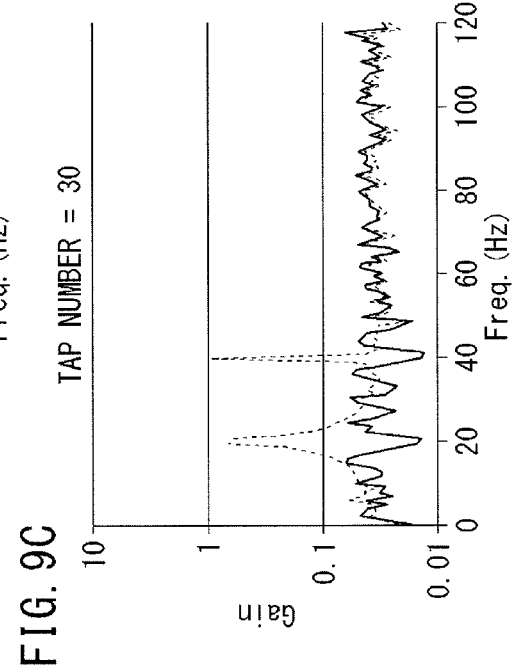
Figure 10A:
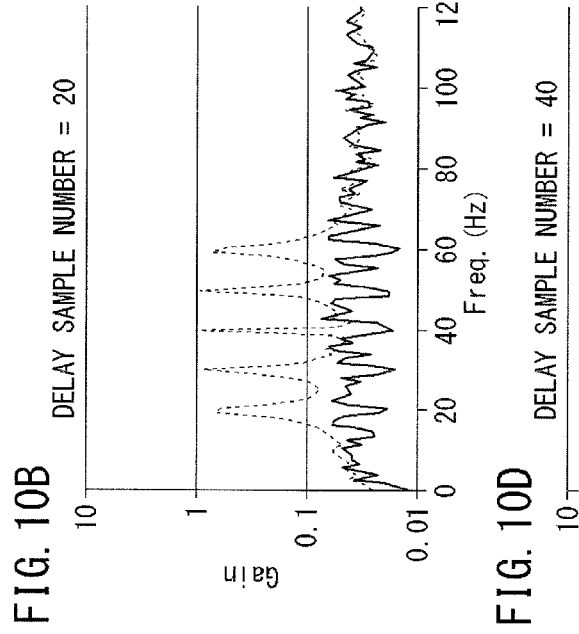
FIGS. 10A to 10D are graphs showing a noise cancellation performance when the delay sample number is changed with respect to a data row with the noise number of 5 and the tap number of 30.
Figure 10B:
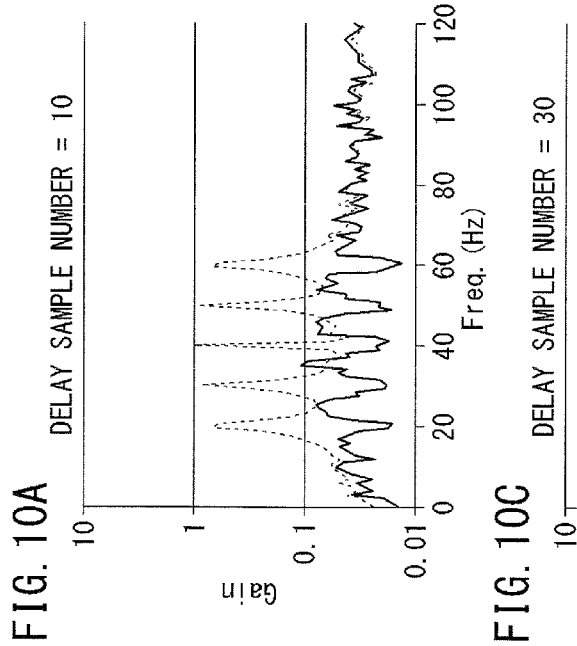
Figure 10C:
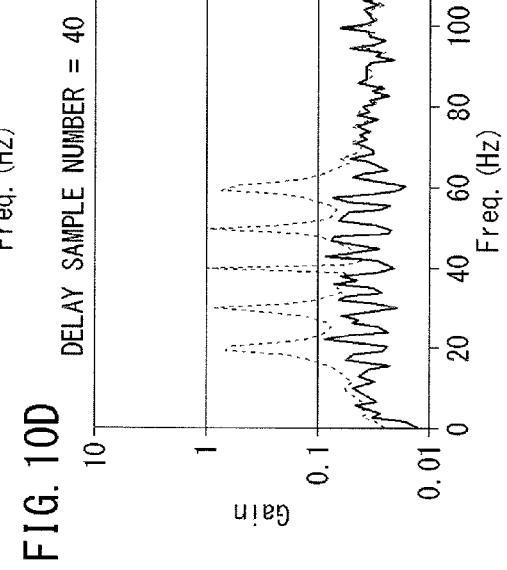
Figure 10D:
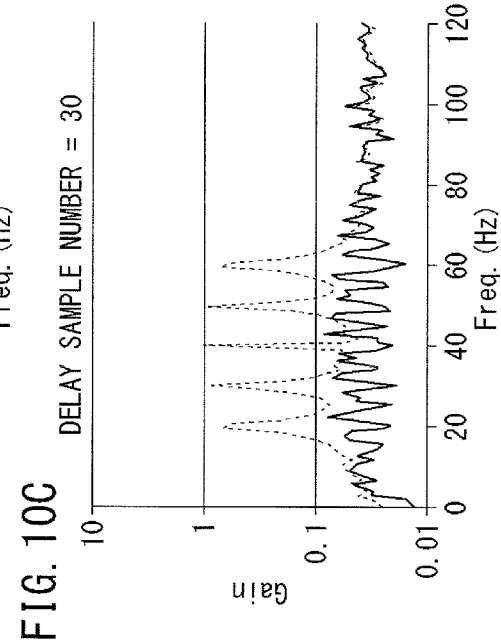
Figure 11A:
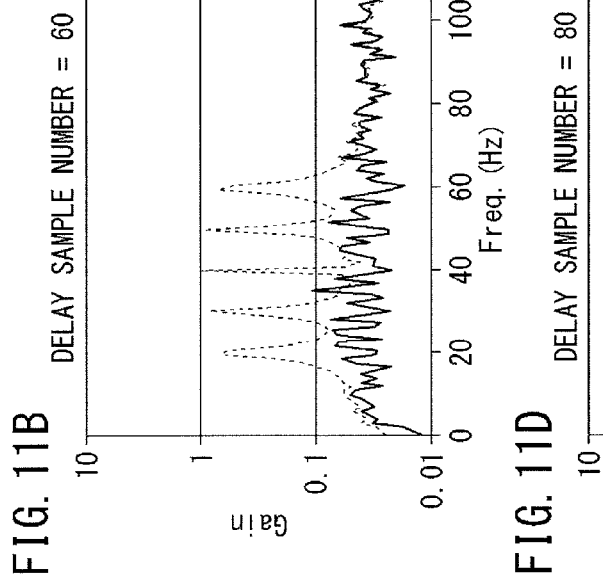
FIGS. 11A to 11D are graphs showing a noise cancellation performance when the delay sample number is changed with respect to the data row with the noise number of 5 and the tap number of 30.
Figure 11B:
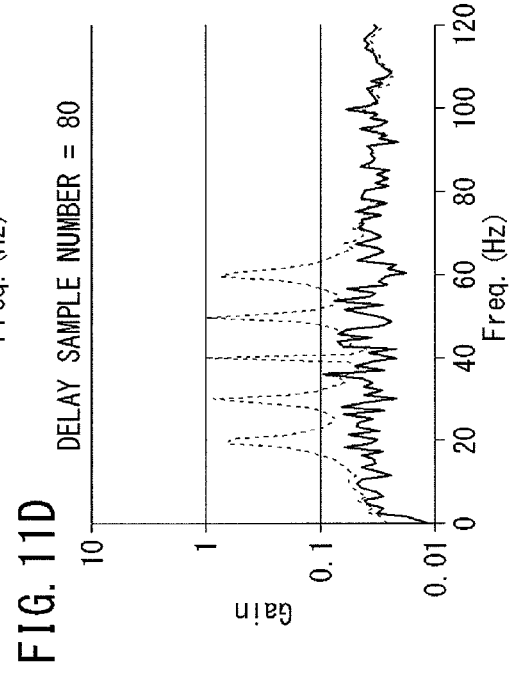
Figure 11C:
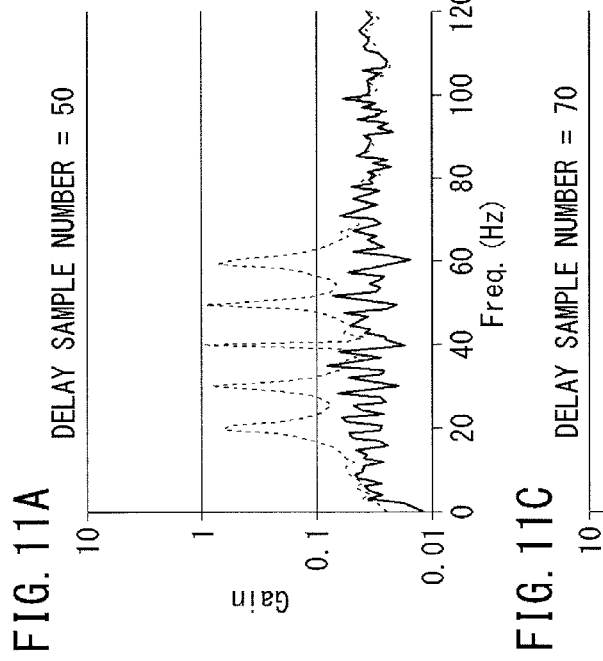
Figure 11D:
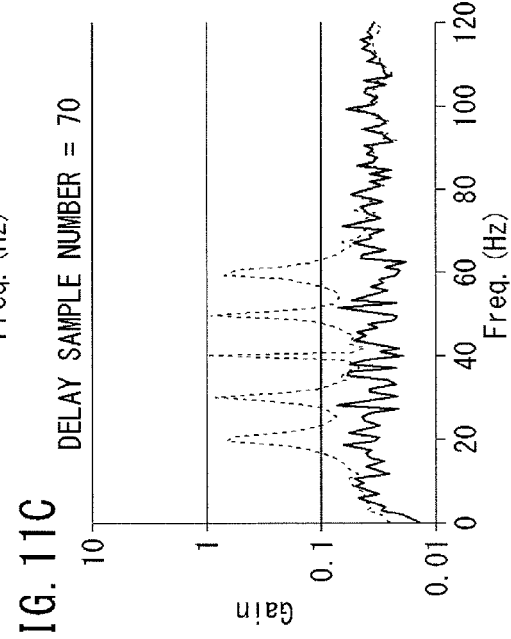
Figure 12A:
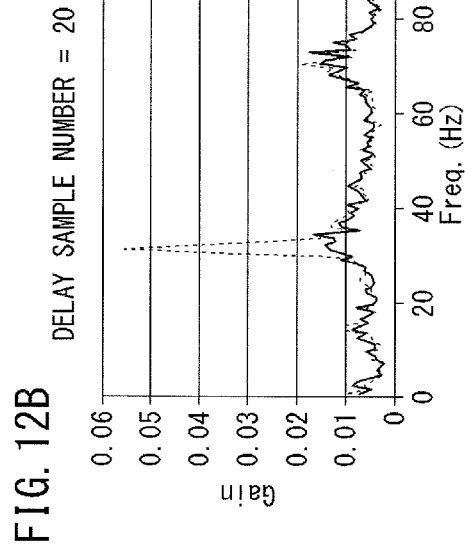
FIGS. 12A to 12D are graphs showing a noise cancellation performance when the delay sample number is changed with respect to actual vehicle data with a periodic road surface noise.
Figure 12B:
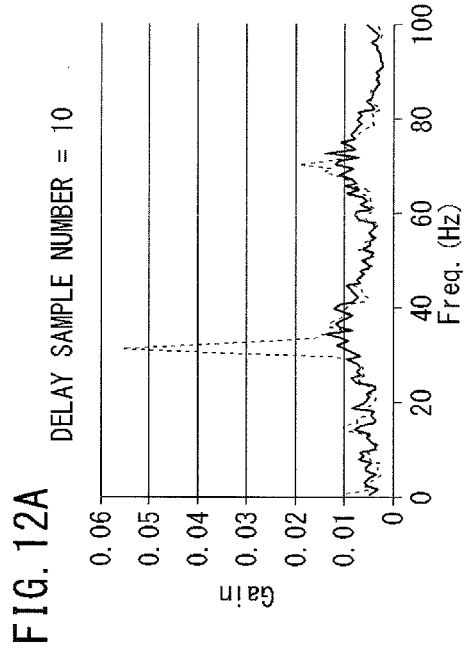
Figure 12C:
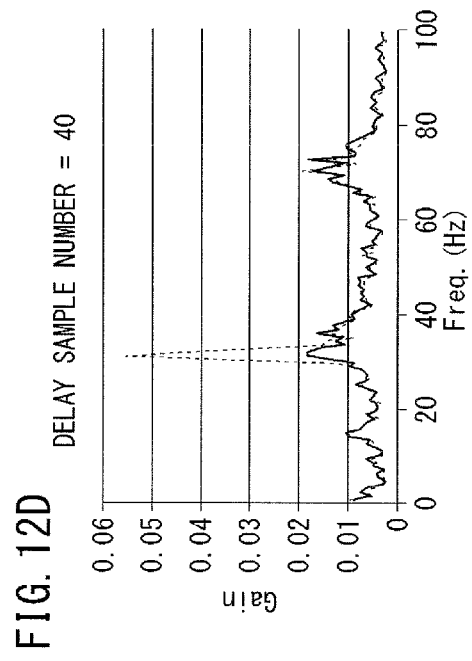
Figure 12D:
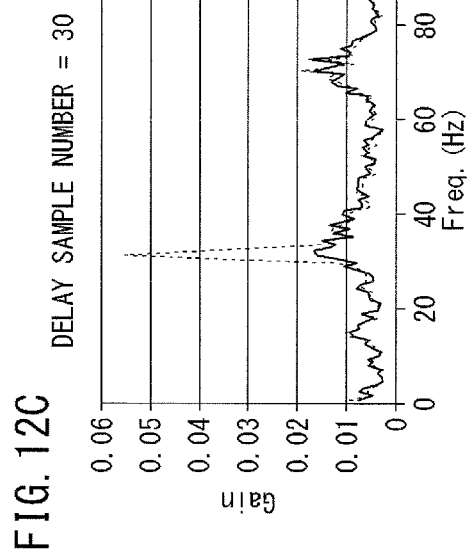
Figure 13A:
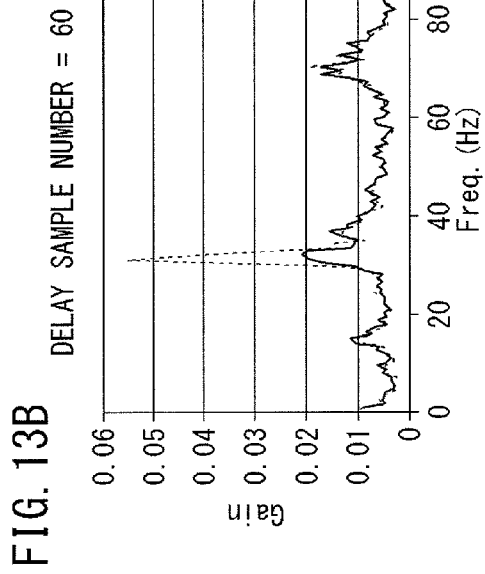
FIGS. 13A to 13D are graphs showing a noise cancellation performance when the delay sample number is changed with respect to the actual vehicle data with the periodic road surface noise.
Figure 13B:
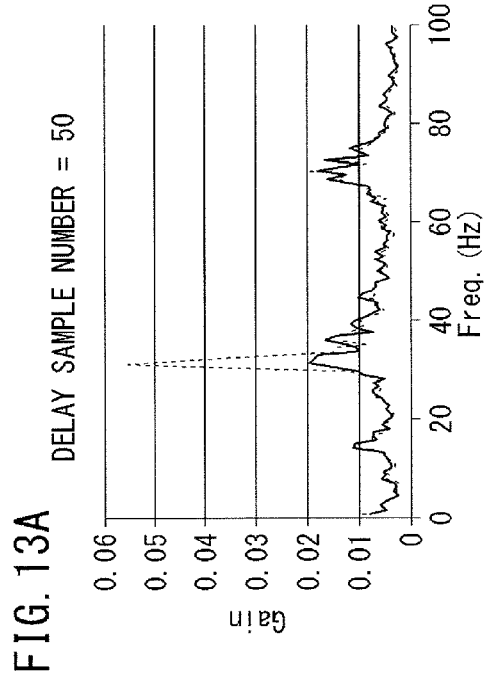
Figure 13C:
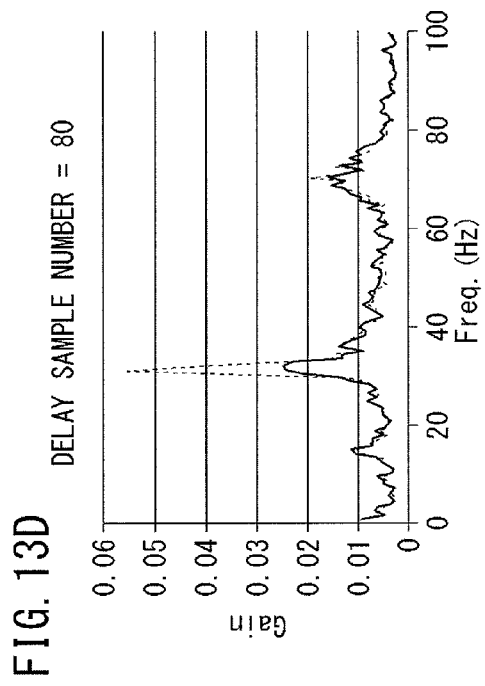
Figure 13D:
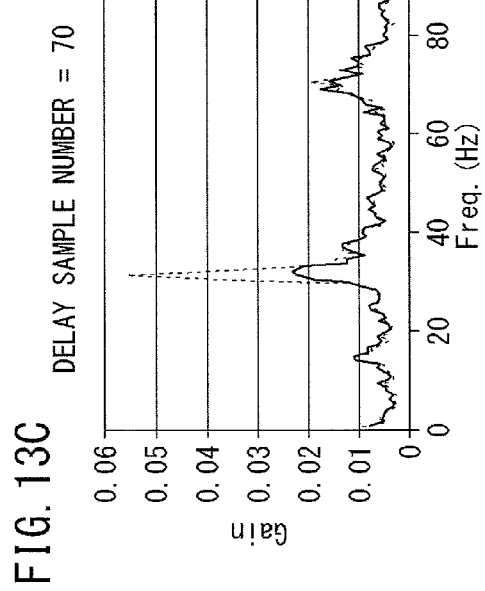

FIG. 5 is a chart showing a system flow in a case where the object-to-be-controlled signal and the reference signal are the same as each other. In this case, the control signal (=y(n)) and the error signal (=e(n)) are expressed by the following expressions (5) and (6), and the filter coefficient vector (=h(k, n)) is updated in accordance with the following expression (7).

$$y(n) = \sum_{k=0}^{N_h-1} h(k, n)\cdot d(n-N_z-k) \quad (5)$$

$$e(n) = d(n) + y(n) \quad (6)$$

$$h(k, n+1) = h(k, n) - 2\cdot\mu\cdot e(n)\cdot d(n-N_z-k) \quad (7)$$

The object-to-be-controlled signal including the noise is denoted by d(n) and the tap number, the step size, and the delay sample number are denoted by $N_h$, μ, and $N_z$ respectively.

It should be noted that $d(n-N_z-k)$ expresses the object-to-be-controlled signal before sampling $(N_z+k)$. When the filter coefficient vector is optimized, no signal (=noise) correlated to the past object-to-be-controlled signal (=reference signal=$d(n-N_z-k)$) exists in the error signal (=e(n)= Output).

When the tap number of the FIR type adaptive digital filter is N and the number of the noise to be removed is K, a formula of K×4≤N≤50 is desirable.

FIGS. 6A to 9D are graphs showing noise cancellation performances when the tap number is changed with the noise number from 2 to 9, the graphs being made by simulation. FIGS. 6A to 9D show cases where the noise number is 9, 5, 3, and 2, respectively. In FIGS. 6A to 9D, a broken line indicates a gain before control, and a solid line indicates a gain after control.

By adding plural frequency sinusoidal waves to a random number (0 to 0.5), an object-to-be-controlled data row (=d(n)) was made, and control simulation of the "FIR type digital filter+LMS algorithm" was performed in order to cancel only the sinusoidal waves. From FIGS. 6A to 9D, it is found that the more the tap number is increased, the more a noise cancellation performance is improved and an influence on parts other than the noise is reduced.

More in detail, as shown in FIGS. 6A to 6D, nine noises can be canceled when the tap number is 40. As shown in FIGS. 7A to 8D, five or three noises can be canceled when the tap number is 20. Further, as shown in FIGS. 9A to 9D, two noises can be canceled when the tap number is 10. From these results, it is found that in order to cancel the noise with the signal of the noise number of K, the tap number of 4×K or more is required. Meanwhile, an upper limit of the tap number depends on a capability of the CPU mounted in the vehicle, and the less tap number requires lower cost. However, from a viewpoint that a noise removal performance is high and a required non-noise signal such as the tire torsional resonance is less influenced, the tap number is desirably about 50 or less.

A time difference Δt (sec) between an acquired time of the past signal used as the reference signal and a current time is desirably 0.16≤Δt≤0.35. When the time difference Δt is too small, the reference signal is correlated to the required signal (signal not to be canceled). Thus, there is a fear that the required signal is canceled. Meanwhile, when the time difference Δt is too large, correlation to the noise to be canceled is reduced, so that the noise cannot be sufficiently canceled.

FIGS. 10A to 11D are graphs showing noise cancellation performances when the delay sample number is changed with respect to a data row with the noise number of 5 and the tap number of 30, the graphs being made by simulation. FIGS. 12A to 13D are graphs showing noise cancellation performances when the delay sample number is changed with respect to actual vehicle measurement data including a periodic road surface noise. In FIGS. 10A to 13D, a broken line indicates a gain before control, and a solid line indicates a gain after control.

From a result of simulation that the delay sample number is changed to 80 (≈0.32 to 0.4 seconds), it is found that with the more delay sample number, a spectral shape after noise cancellation is more favorable and the non-noise signal is less influenced. When the delay sample signal is too small, the non-noise signal is largely influenced. In the actual vehicle data analysis of FIGS. 12A to 13D, the remaining noise is increased around the delay sample number of 60 or more. Thus, it is thought that when the delay sample number is too large, due to attenuation of the noise signal, the correlation to the reference signal is lost and the noise cancellation performance is lowered.

From the above result, it is thought that the minimum desirable delay sample number is about 40 (≈0.16 seconds: 4 msec×40) whereas the maximum desirable delay sample number is about 70 (≈0.35 seconds: 5 msec×70).

Figure 14:
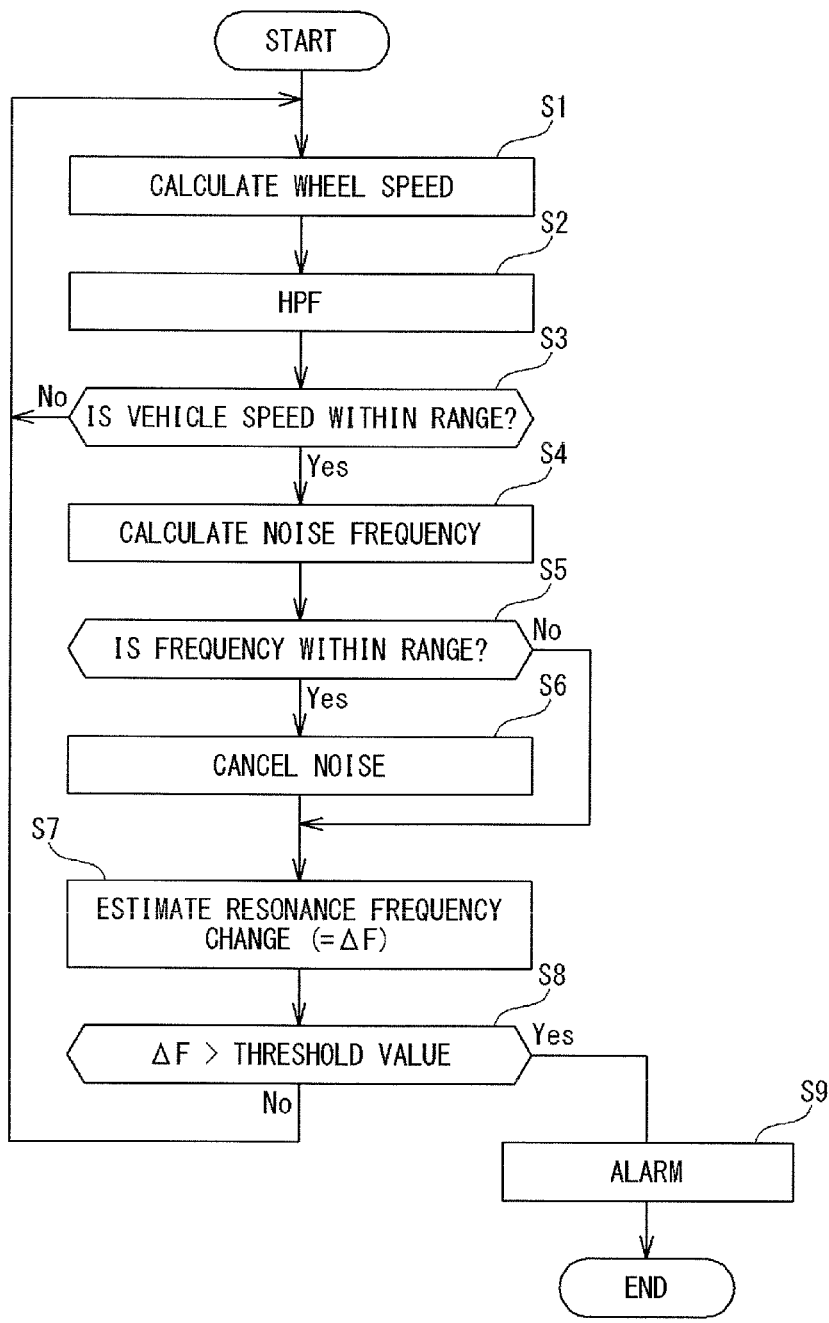
FIG. 14 is a flowchart showing actions of the detection apparatus in which an ANC is built.

Next, actions of the detection device or the detection method according to the first embodiment or the second embodiment will be described. FIG. 14 is a flowchart showing the actions of the detection device in which the ANC is built.

(1) Firstly, in Step S1, the control unit 2 obtains the wheel speed signal (wheel speed) by re-sampling a wheel rotation signal detected by the wheel speed detection unit in accordance with a predetermined cycle. There is a need for determining the cycle in consideration with the resonance frequency in the torsional direction of the focused tire. Specifically, the focused resonance frequency in the torsional direction appears in the vicinity of the tens of Hz. Thus, the sampling frequency of 100 Hz or more is desirable.

(2) Next, in Step S2, the wheel speed signal obtained in Step S1 passes through a high pass filter so as to remove a direct current component included in the wheel speed signal. It should be noted that in a case where not the wheel speed signal but the acceleration signal is acquired, the direct current component is not included in the acceleration signal and hence Step S2 can be omitted.

(3) Next, in Step S3, the control unit 2 judges whether or not the vehicle speed is within a predetermined range (such as 30 to 120 kph). When it is judged that the vehicle speed is within the predetermined range, the processing advances to Step S4.

(4) Next, in Step S4, the control unit 2 calculates the frequency of the engine noise serving as the periodic noise from the engine rotation number and the cylinder number. It should be noted that in a case where the ANC has a frequency estimate function, the frequency calculation in Step S4 is not required. In a case where the "FIR type adaptive digital filter+LMS algorithm" is used as in the second embodiment, the signal correlated to the reference signal (in this case, the past signal of the signal) can be selectively removed irrespective of the frequency. Thus, the frequency calculation in Step S4 is not required.

(5) Next, in Step S5, the control unit 2 judges whether or not the frequency of the noise is within a predetermined range (such as 25 to 65 Hz). When it is judged that the frequency is within the predetermined range, the processing advances to Step S6. It should be noted that the "FIR type adaptive digital filter+LMS algorithm" is used, the signal correlated to the reference signal (in this case, the past signal of the signal) can be selectively removed irrespective of the frequency. Thus, the judgement of the frequency range in Step S5 is not required.

(6) Next, in Step S6, the noise is removed in accordance with the above method shown in the first embodiment or the second embodiment.

(7) Next, in Step S7, the control unit 2 compares a resonance frequency estimated based on the wheel speed signal in a state where the noise is removed, and a reference resonance frequency, estimates a difference ΔF between the frequencies, and in the subsequent Step S8, judges whether or not the estimated difference ΔF is larger than a predetermined threshold value (such as 2 Hz). The reference resonance frequency is estimated at the time of initialization after tire replacement or after pressure adjustment, and stored in the RAM 2d of the control unit 2.

(8) In Step 8, when it is judged that the difference ΔF is larger than the predetermined threshold value, the control unit 2 judges that the tire is under-inflated, and causes the alarm 5 to issue an alarm.

Example

Examples of the detection method of the present invention will be described. However, the present invention is not limited only to such examples.

Example 1

Figure 15A:
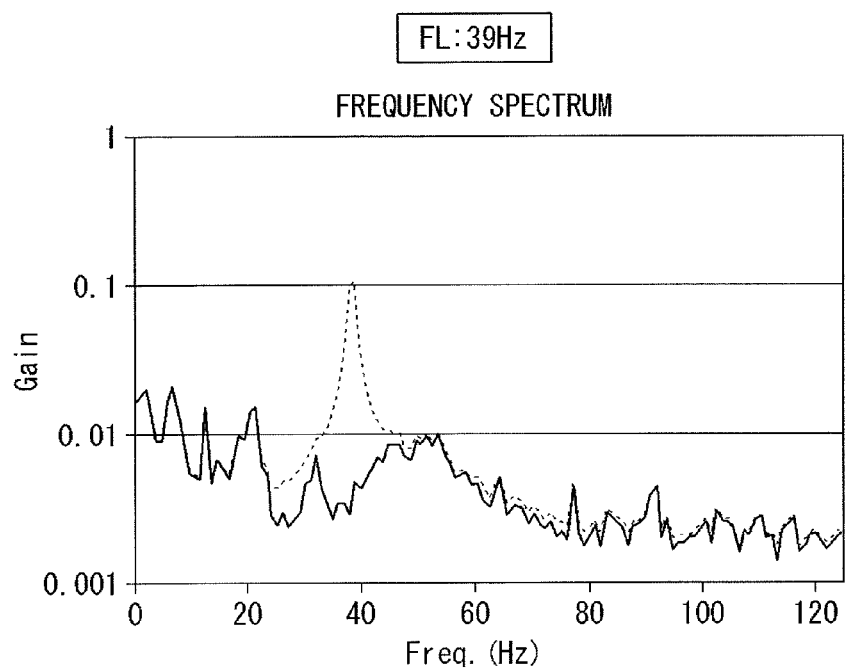
FIGS. 15A and 15B are graphs showing an example in which an engine noise is canceled with using the DXHS according to a first embodiment.
Figure 15B:
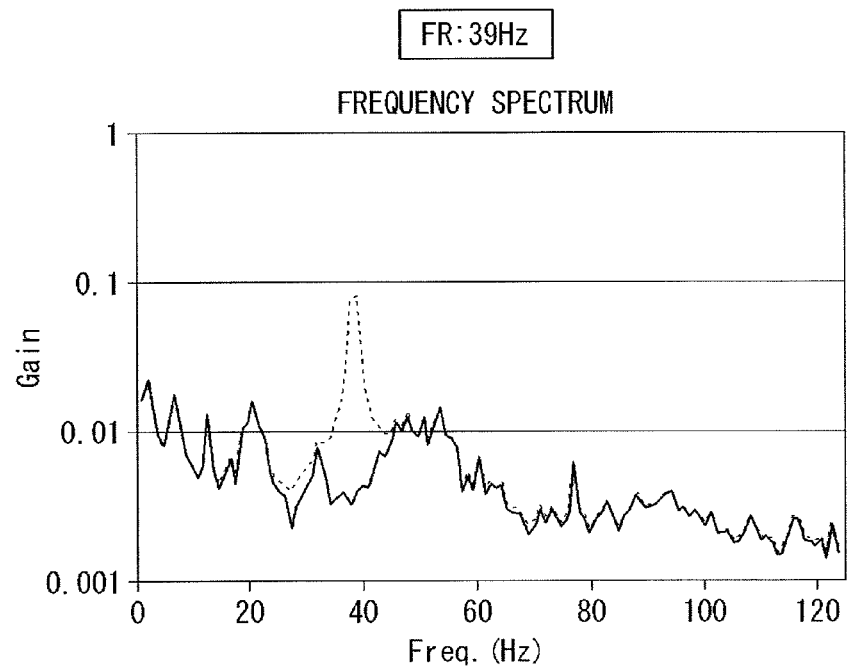

A small FF (front-engine, front-drive) vehicle of a three-cylinder engine traveled in a test course (round circuit) and wheel speed of two front wheels was measured. The FF vehicle is a manual transmission vehicle, and data obtained when the vehicle traveled with a gearshift position of "fifth" at 60 kph was used. An engine noise in the vicinity of 39 Hz was canceled with using the DXHS according to the first embodiment. A result is shown in FIGS. 15A and 15B. In FIGS. 15A and 15B, a broken line indicates a gain before control, and a solid line indicates a gain after control.

Example 2

Figure 16A:
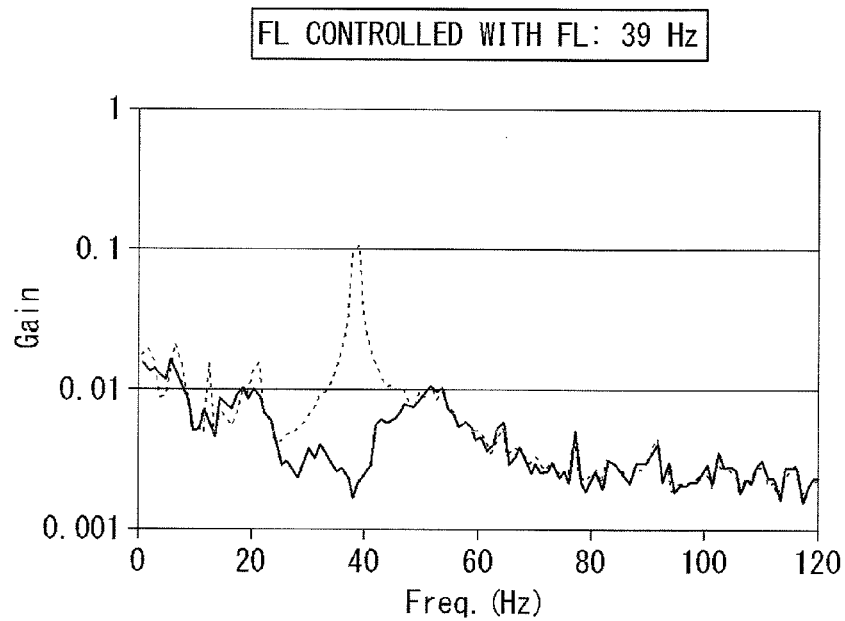
FIGS. 16A and 16B are graphs showing an example in which the engine noise is canceled with using an FIR type adaptive digital filter and an LMS algorithm according to a second embodiment.
Figure 16B:
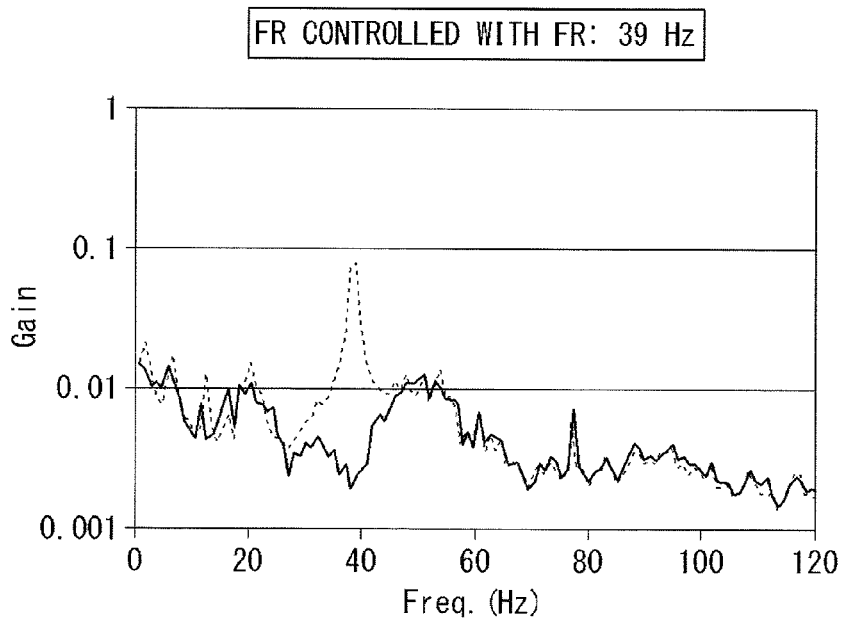

The engine noise in the vicinity of 39 Hz was canceled in the same way as Example 1 except that the FIR type adaptive digital filter and the LMS algorithm according to the second embodiment were used in place of the DXHS according to the first embodiment. A sample delay time was 0.16 sec and the tap number was 20. A result is shown in FIGS. 16A and 16B. In FIGS. 16A and 16B, a broken line indicates a gain before control, and a solid line indicates a gain after control.

Comparative Example

Figure 17:
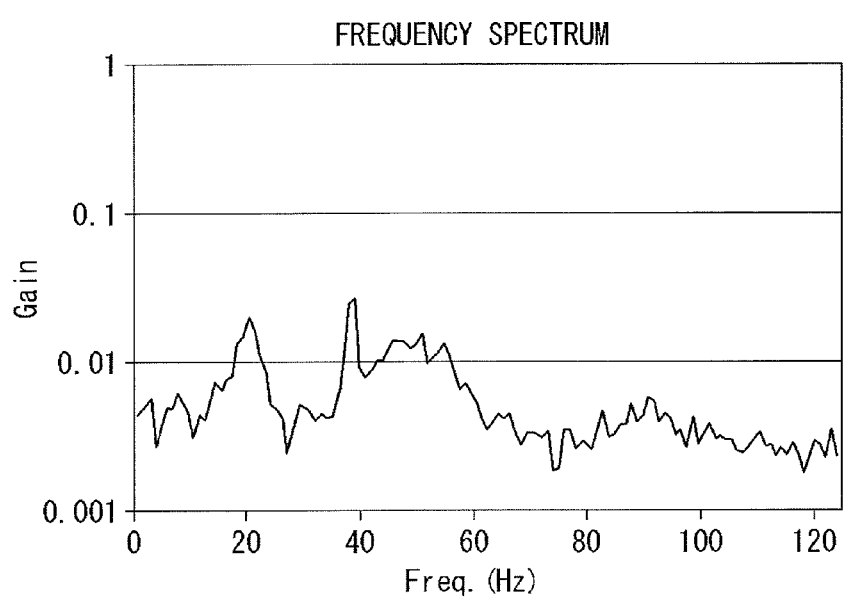
FIG. 17 is a graph showing an example in which the engine noise is canceled with using a conventional difference method.

The engine noise in the vicinity of 39 Hz was canceled in the same way as Example 1 except that a conventional difference method shown in Patent Literature 1, Non-Patent Literature 1, or the like was used. A result is shown in FIG. 17.

As can be found from FIGS. 15A to 17, although the engine noise remains in the vicinity of 39 Hz even with a difference obtained in the conventional method (Comparative Example) in which a difference between a FL wheel signal and a FR wheel signal is simply obtained, the engine noise was canceled in a case of using the DXHS (Example 1) or the FIR type adaptive digital filter and the LMS algorithm (Example 2).

Other Modified Example

The present invention is not limited to the above embodiments but various modifications can be made within the scope of the claims.

For example, in the above embodiments, the torsional resonance frequency of the wheel speed serving as the rotation speed information is determined by time-series estimate. However, instead of the wheel speed, a torsional resonance frequency of vehicle acceleration serving as rotation acceleration information can also be determined by time-series estimate. In this case, from the rotation speed information obtained by the rotation speed information detection unit, the rotation acceleration information is calculated by the control unit functioning as a rotation acceleration information calculation unit. From the calculated rotation acceleration information, a torsional resonance frequency of the rotation acceleration information is time-series estimated by the control unit functioning as the resonance frequency estimate unit.

In the above embodiments, upon applying the system in which the FIR type adaptive digital filter using the LMS algorithm is used, the past signal of the signal serving as an object to be controlled is used as the reference signal. However, the "reference signal" in the present invention is not limited to this. For example, in a case where an engine noise of a certain wheel is removed, a signal of the other wheel on the same axle as the above wheel can also be the reference signal. Specifically, in a case where an engine noise of a left-front wheel is removed, a signal of a right front wheel can be the reference signal. Conversely, in a case where an engine noise of the right front wheel is removed, a signal of the left-front wheel can be the reference signal. In this case, it is already found that the same noise removal effect as the case where the past signal is the reference signal is also obtained. Unlike the conventional technique of simply obtaining the difference, even when there is a gain difference or a phase difference in the noise superimposed on the left and right wheels, the noise can be removed.

At that time, a time difference $\Delta t$ (sec) between an acquired time of the signal used as the reference signal and a current time is desirably:

$$0 \leq \Delta t \leq 0.35$$

wherein

"acquired time of reference signal"="current time"$-\Delta t$.

Figure 18:
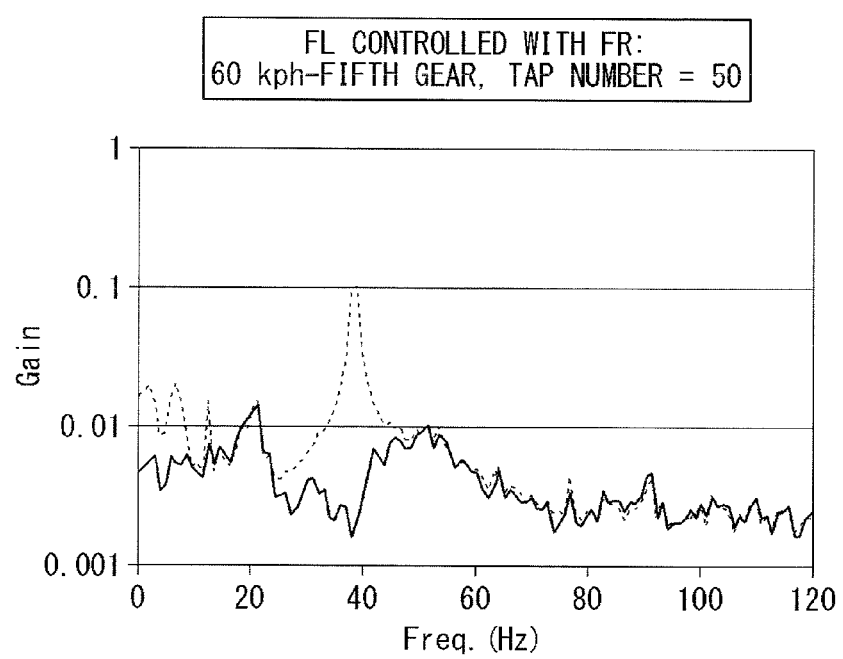
FIG. 18 is a graph showing an example in which the engine noise is canceled with using the FIR type adaptive digital filter and the LMS algorithm.

FIG. 18 is a graph showing an example in which the engine noise is canceled with using the FIR type adaptive digital filter and the LMS algorithm, showing an example in which an engine noise of a left-front wheel is removed (controlled) with a signal of a right front wheel as the reference signal. As well as Example 1, a small FF vehicle of a three-cylinder engine traveled in a test course and wheel speed of two front wheels was measured. The FF vehicle is a manual transmission vehicle, and data obtained when the vehicle traveled with a gearshift position of "fifth" at 60 kph was used. The tap number was 50. In FIG. 18, a broken line indicates a gain before control, and a solid line indicates a gain after control. It is found that at the time of removing the engine noise of the left-front wheel, the engine noise is removed by making the signal of the right front wheel on the same axle the reference signal.

In a case where a periodic road surface noise of a certain wheel is removed, a signal of the other wheel on the same side as the above wheel can also be the reference signal. Specifically, in a case where a periodic road surface noise of a right front wheel is removed, a signal of a right rear wheel can be the reference signal. Conversely, in a case where a periodic road surface noise of the right rear wheel is removed, a signal of the right front wheel can be the reference signal. In a case of the periodic road surface noise, the front wheels and the rear wheels pass through the same road surface by a time difference of wheelbase (m)/vehicle speed (m/sec). Thus, for example, in order to remove the periodic road surface noise of the right front wheel, the signal of the right rear wheel can be the reference signal.

At that time, a time difference $\Delta t$ (sec) between an acquired time of the signal used as the reference signal and a current time is desirably:

$$0 \leq \Delta t \leq \text{wheelbase (m)/vehicle speed (m/sec)} \times 3$$

wherein

"acquired time of reference signal"="current time"$-\Delta t$ in a case where the rear wheel is controlled with the front wheel as the reference signal, and "acquired time of reference signal"="current time"$+\Delta t$ in a case where the front wheel is controlled with the rear wheel as the reference signal.

Figure 19:
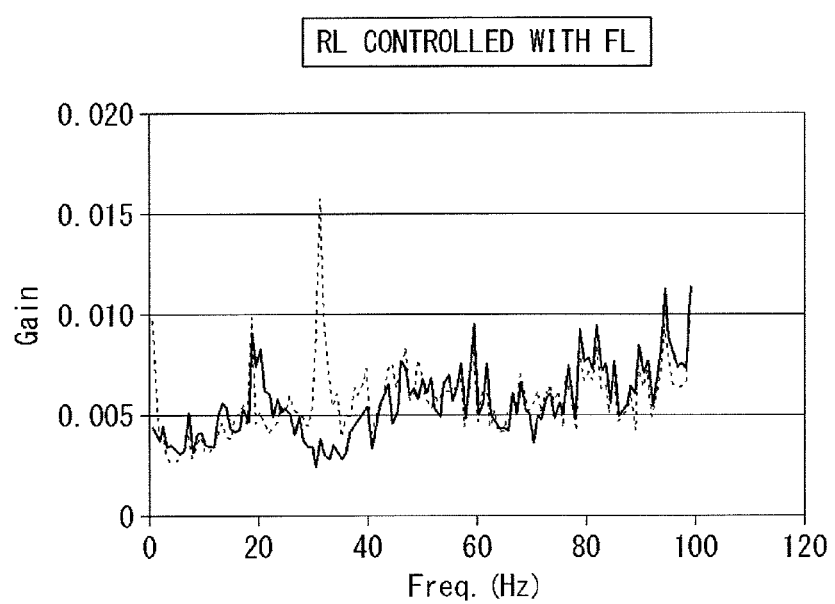
FIG. 19 is a graph showing an example in which the periodic road surface noise is canceled with using the FIR type adaptive digital filter and the LMS algorithm.

FIG. 19 is a graph showing an example in which a periodic road surface noise is canceled with using the FIR type adaptive digital filter and the LMS algorithm, showing an example in which a periodic road surface noise of a left rear wheel is removed (controlled) with a signal of a left-front wheel as the reference signal. A FF vehicle of 2.4 liter displacement traveled in a public road having a periodic road surface and wheel speed of the left rear wheel and the left-front wheel was measured. The FF vehicle is an automatic transmission vehicle. In FIG. 19, a broken line indicates a gain before control, and a solid line indicates a gain after control. It is found that at the time of removing the periodic road surface noise of the left rear wheel, the periodic road surface noise is removed by making the signal of the left-front wheel on the same side the reference signal.

REFERENCE SIGNS LIST

1: WHEEL SPEED DETECTION UNIT
2: CONTROL UNIT
2a: INTERFACE
2b: CPU
2c: ROM
2d: RAM
3: DISPLAY
4: INITIALIZATION BUTTON
5: ALARM

What is claimed is:

1. A tire pressure decrease detection apparatus comprising:

a rotation speed information detection unit for detecting rotation speed information of wheels of a vehicle;

a resonance frequency estimate unit for time-series estimating a torsional resonance frequency of the rotation speed information from the rotation speed information obtained by the rotation speed information detection unit; and
a judgment unit for judging a decrease in pressure of tires installed in the wheels based on the estimated torsional resonance frequency,
wherein the resonance frequency estimate unit includes a noise removal unit for removing a noise superimposed on a wheel speed signal serving as the rotation speed information for each of the wheels with using an active noise control technology;
wherein the active noise control technology is a Finite Impulse Response (FIR) type adaptive digital filter using a past signal of the wheel speed signal serving as an object to be controlled as a reference signal, and an LMS algorithm as an adaptive algorithm,
wherein a time difference $\Delta t$ (sec) between an acquired time of the past signal used as the reference signal and a current time satisfies a formula of $0.16 \leq \Delta t \leq 0.35$,
wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel speed signal, to affect operation of the vehicle, and
wherein the noise removal unit functions at vehicle speed of 30 to 120 kph, and a calculation cycle of the noise removal unit is 3 to 10 msec.

2. A tire pressure decrease detection apparatus comprising:
a rotation speed information detection unit for detecting rotation speed information of wheels of a vehicle;
a rotation acceleration information calculation unit for calculating rotation acceleration information of the wheels from the rotation speed information obtained by the rotation speed information detection unit;
a resonance frequency estimate unit for time-series estimating a torsional resonance frequency of the rotation acceleration information from the rotation acceleration information calculated by the rotation acceleration information calculation unit; and
a judgment unit for judging a decrease in pressure of the tires based on the estimated torsional resonance frequency,
wherein the resonance frequency estimate unit includes a noise removal unit for removing a noise superimposed on a wheel acceleration signal serving as the rotation acceleration information for each of the wheels with using an active noise control technology;
wherein the active noise control technology is a Finite Impulse Response (FIR) type adaptive digital filter using a past signal of the wheel acceleration signal serving as an object to be controlled as a reference signal, and an LMS algorithm as an adaptive algorithm,
wherein a time difference $\Delta t$ (sec) between an acquired time of the past signal used as the reference signal and a current time satisfies a formula of $0.16 \leq \Delta t \leq 0.35$, and
wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel acceleration signal, to affect operation of the vehicle.

3. A tire pressure decrease detection apparatus comprising:
a rotation speed information detection unit for detecting rotation speed information of wheels of a vehicle;
a resonance frequency estimate unit for time-series estimating a torsional resonance frequency of the rotation speed information from the rotation speed information obtained by the rotation speed information detection unit; and
a judgment unit for judging a decrease in pressure of tires installed in the wheels based on the estimated torsional resonance frequency,
wherein the resonance frequency estimate unit includes a noise removal unit for removing a noise superimposed on a wheel speed signal serving as the rotation speed information for each of the wheels with using an active noise control technology;
wherein the active noise control technology is a Finite Impulse Response (FIR) type adaptive digital filter using a wheel speed signal of the other wheel on the same axle as the wheel of which an engine noise is to be removed as a reference signal, and an LMS algorithm as an adaptive algorithm,
wherein a time difference $\Delta t$ (sec) between an acquired time of the signal used as the reference signal and a current time satisfies a formula of $0 \leq \Delta t \leq 0.35$, in which "acquired time of reference signal"="current time"$-\Delta t$, and
wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel speed signal, to affect operation of the vehicle.

4. The tire pressure decrease detection apparatus of claim 3, wherein the noise removal unit functions at vehicle speed of 30 to 120 kph, and a calculation cycle of the noise removal unit is 3 to 10 msec.

5. The tire pressure decrease detection apparatus of claim 4, wherein the tire pressure decrease detection apparatus satisfies a formula of $K \times 4 \leq N \leq 50$, wherein N is a tap number of the FIR type adaptive digital filter and K is the number of the noise to be removed.

6. A tire pressure decrease detection apparatus comprising:
a rotation speed information detection unit for detecting rotation speed information of wheels of a vehicle;
a rotation acceleration information calculation unit for calculating rotation acceleration information of the wheels from the rotation speed information obtained by the rotation speed information detection unit;
a resonance frequency estimate unit for time-series estimating a torsional resonance frequency of the rotation acceleration information from the rotation acceleration information calculated by the rotation acceleration information calculation unit; and
a judgment unit for judging a decrease in pressure of the tires based on the estimated torsional resonance frequency,
wherein the resonance frequency estimate unit includes a noise removal unit for removing a noise superimposed on a wheel acceleration signal serving as the rotation acceleration information for each of the wheels with using an active noise control technology;
wherein the active noise control technology is a Finite Impulse Response (FIR) type adaptive digital filter using a wheel speed signal of the other wheel on the same axle as the wheel of which an engine noise is to be removed as a reference signal, and an LMS algorithm as an adaptive algorithm, wherein a time difference Δt (sec) between an acquired time of the signal used as the reference signal and a current time satisfies a formula of 0≤Δt≤0.35, in which "acquired time of reference signal"="current time"−Δt, and wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel acceleration signal, to affect operation of the vehicle.

7. The tire pressure decrease detection apparatus of claim 6, wherein the noise removal unit functions at vehicle speed of 30 to 120 kph, and a calculation cycle of the noise removal unit is 3 to 10 msec.

8. The tire pressure decrease detection apparatus of claim 7, wherein the tire pressure decrease detection apparatus satisfies a formula of K×4≤N≤50, wherein N is a tap number of the FIR type adaptive digital filter and K is the number of the noise to be removed.

9. A tire pressure decrease detection apparatus comprising:
   a rotation speed information detection unit for detecting rotation speed information of wheels of a vehicle;
   a resonance frequency estimate unit for time-series estimating a torsional resonance frequency of the rotation speed information from the rotation speed information obtained by the rotation speed information detection unit; and
   a judgment unit for judging a decrease in pressure of tires installed in the wheels based on the estimated torsional resonance frequency,
   wherein the resonance frequency estimate unit includes a noise removal unit for removing a noise superimposed on a wheel speed signal serving as the rotation speed information for each of the wheels with using an active noise control technology;
   wherein the active noise control technology is a Finite Impulse Response (FIR) type adaptive digital filter using a wheel acceleration signal of the other wheel on the same side as the wheel of which a periodic road surface noise is to be removed as a reference signal, and an LMS algorithm as an adaptive algorithm,
   wherein a time difference Δt (sec) between an acquired time of the signal used as the reference signal and a current time is 0≤Δt≤wheelbase (m)/vehicle speed (m/sec)×3, in which "acquired time of reference signal"="current time"−Δt in a case where a rear wheel is controlled with a front wheel as the reference signal, and "acquired time of reference signal"="current time"+Δt in a case where the front wheel is controlled with the rear wheel as the reference signal, and
   wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel speed signal, to affect operation of the vehicle.

10. The tire pressure decrease detection apparatus of claim 9, wherein the noise removal unit functions at vehicle speed of 30 to 120 kph, and a calculation cycle of the noise removal unit is 3 to 10 msec.

11. The tire pressure decrease detection apparatus of claim 10, wherein the tire pressure decrease detection apparatus satisfies a formula of K×4≤N≤50, wherein N is a tap number of the FIR type adaptive digital filter and K is the number of the noise to be removed.

12. A tire pressure decrease detection apparatus comprising:
   a rotation speed information detection unit for detecting rotation speed information of wheels of a vehicle;
   a rotation acceleration information calculation unit for calculating rotation acceleration information of the wheels from the rotation speed information obtained by the rotation speed information detection unit;
   a resonance frequency estimate unit for time-series estimating a torsional resonance frequency of the rotation acceleration information from the rotation acceleration information calculated by the rotation acceleration information calculation unit; and
   a judgment unit for judging a decrease in pressure of the tires based on the estimated torsional resonance frequency,
   wherein the resonance frequency estimate unit includes a noise removal unit for removing a noise superimposed on a wheel acceleration signal serving as the rotation acceleration information for each of the wheels with using an active noise control technology;
   wherein the active noise control technology is a Finite Impulse Response (FIR) type adaptive digital filter using a wheel acceleration signal of the other wheel on the same side as the wheel of which a periodic road surface noise is to be removed as a reference signal, and an LMS algorithm as an adaptive algorithm,
   wherein a time difference Δt (sec) between an acquired time of the signal used as the reference signal and a current time is 0≤Δt≤wheelbase (m)/vehicle speed (m/sec)×3, in which "acquired time of reference signal"="current time"−Δt in a case where a rear wheel is controlled with a front wheel as the reference signal, and "acquired time of reference signal"="current time"+Δt in a case where the front wheel is controlled with the rear wheel as the reference signal, and
   wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel acceleration signal, to affect operation of the vehicle.

13. The tire pressure decrease detection apparatus of claim 12, wherein the noise removal unit functions at vehicle speed of 30 to 120 kph, and a calculation cycle of the noise removal unit is 3 to 10 msec.

14. The tire pressure decrease detection apparatus of claim 13, wherein the tire pressure decrease detection apparatus satisfies a formula of K×4≤N≤50, wherein N is a tap number of the FIR type adaptive digital filter and K is the number of the noise to be removed.

15. A tire pressure decrease detection method including:
   a rotation speed information detection step for detecting rotation speed information of wheels of a vehicle;
   a resonance frequency estimate step for time-series estimating a torsional resonance frequency of the rotation speed information from the rotation speed information obtained in the rotation speed information detection step; and a judgment step for judging a decrease in pressure of tires installed in the wheels based on the estimated torsional resonance frequency, wherein the resonance frequency estimate step includes a noise removal step for removing a noise superimposed on a wheel speed signal serving as the rotation speed information for each of the wheels with using an active noise control technology;

wherein the active noise control technology is a Finite Impulse Response (FIR) type adaptive digital filter using a past signal of the wheel speed signal serving as an object to be controlled as a reference signal, and an LMS algorithm as an adaptive algorithm, wherein a time difference $\Delta t$ (sec) between an acquired time of the past signal used as the reference signal and a current time satisfies a formula of $0.16 \leq \Delta t \leq 0.35$, and wherein the tire pressure decrease detection method further comprises applying the judged decrease in pressure to the vehicle to generate a report regarding the tire pressure, which eliminates an erroneous report or non-alarm and eliminates an influence of the noise superimposed on the wheel speed signal, to affect operation of the vehicle.

16. The tire pressure decrease detection method of claim 15, wherein a formula of $K \times 4 \leq N \leq 50$ is satisfied when a tap number of the FIR type adaptive digital filter is N and the number of the noise to be removed is K.

17. The tire pressure decrease detection method of claim 15, wherein the noise removal unit functions at vehicle speed of 30 to 120 kph, and a calculation cycle of the noise removal unit is 3 to 10 msec.

18. The tire pressure decrease detection method of claim 17, wherein the tire pressure decrease detection apparatus satisfies a formula of $K \times 4 \leq N \leq 50$, wherein N is a tap number of the FIR type adaptive digital filter and K is the number of the noise to be removed.

19. A tire pressure decrease detection method including:
a rotation speed information detection step for detecting rotation speed information of wheels of a vehicle;
a rotation acceleration information calculation step for calculating rotation acceleration information of the wheels from the rotation speed information obtained in the rotation speed information detection step;
a resonance frequency estimate step for time-series estimating a torsional resonance frequency of the rotation acceleration information from the rotation acceleration information calculated in the rotation acceleration information calculation step; and
a judgment step for judging a decrease in pressure of the tires based on the estimated torsional resonance frequency,
wherein the resonance frequency estimate step includes a noise removal step for removing a noise superimposed on a wheel acceleration signal serving as the rotation acceleration information for each of the wheels with using an active noise control technology;
wherein the active noise control technology is a Finite Impulse Response (FIR) type adaptive digital filter using a past signal of the wheel acceleration signal serving as an object to be controlled as a reference signal, and an LMS algorithm as an adaptive algorithm,
wherein a time difference $\Delta t$ (sec) between an acquired time of the past signal used as the reference signal and a current time satisfies a formula of $0.16 \leq \Delta t \leq 0.35$, and
wherein the tire pressure decrease detection method further comprises applying the judged decrease in pressure to the vehicle to generate a report regarding the tire pressure, which eliminates an erroneous report or non-alarm and eliminates an influence of the noise superimposed on the wheel acceleration signal, to affect operation of the vehicle.

20. The tire pressure decrease detection method of claim 19, wherein the noise removal unit functions at vehicle speed of 30 to 120 kph, and a calculation cycle of the noise removal unit is 3 to 10 msec.

21. The tire pressure decrease detection method of claim 20, wherein the tire pressure decrease detection apparatus satisfies a formula of $K \times 4 \leq N \leq 50$, wherein N is a tap number of the FIR type adaptive digital filter and K is the number of the noise to be removed.

22. A non-transitory computer-readable medium storing a tire pressure decrease detection program configured to, when executed by a computer, cause the computer, for detecting a decrease in pressure of tires based on a resonance frequency of the tires of a traveling vehicle, to function as:
a resonance frequency estimate unit for time-series estimating a torsional resonance frequency of rotation speed information from the rotation speed information obtained by a rotation speed information detection unit for detecting the rotation speed information of wheels of the vehicle, and
a judgment unit for judging the decrease in the pressure of the tires installed in the wheels based on the estimated torsional resonance frequency,
wherein the resonance frequency estimate unit includes a noise removal unit for removing a noise superimposed on a wheel speed signal serving as the rotation speed information for each of the wheels with using an active noise control technology;
wherein the active noise control technology is a Finite Impulse Response (FIR) type adaptive digital filter using a past signal of the wheel speed signal serving as an object to be controlled as a reference signal, and an LMS algorithm as an adaptive algorithm,
wherein a time difference $\Delta t$ (sec) between an acquired time of the past signal used as the reference signal and a current time satisfies a formula of $0.16 \leq \Delta t \leq 0.35$, and
wherein the tire pressure decrease detection program is further configured to, when executed by the computer, cause the computer to apply the judged decrease in pressure to the vehicle to generate a report regarding the tire pressure, which eliminates an erroneous report or non-alarm and eliminates an influence of the noise superimposed on the wheel speed signal, to affect operation of the vehicle.

23. The non-transitory computer-readable medium of claim 22, wherein the noise removal unit functions at vehicle speed of 30 to 120 kph, and a calculation cycle of the noise removal unit is 3 to 10 msec.

24. The non-transitory computer-readable medium of claim 23, wherein the tire pressure decrease detection apparatus satisfies a formula of $K \times 4 \leq N \leq 50$, wherein N is a tap number of the FIR type adaptive digital filter and K is the number of the noise to be removed.

25. A non-transitory computer-readable medium storing a tire pressure decrease detection program configured to, when executed by a computer, cause the computer, for detecting a decrease in pressure of tires based on a resonance frequency of the tires of a traveling vehicle, to function as:
a rotation acceleration information calculation unit for calculating rotation acceleration information of wheels from rotation speed information obtained by a rotation speed information detection unit for detecting the rotation speed information of the wheels of the vehicle,
a resonance frequency estimate unit for time-series estimating a torsional resonance frequency of the rotation acceleration information from the rotation acceleration information calculated by the rotation acceleration information calculation unit, and
a judgment unit for judging the decrease in the pressure of the tires based on the estimated torsional resonance frequency,
wherein the resonance frequency estimate unit includes a noise removal unit for removing a noise superimposed on a wheel acceleration signal serving as the rotation acceleration information for each of the wheels with using an active noise control technology;
wherein the active noise control technology is a Finite Impulse Response (FIR) type adaptive digital filter using a past signal of the wheel acceleration signal serving as an object to be controlled as a reference signal, and an LMS algorithm as an adaptive algorithm,
wherein a time difference Δt (sec) between an acquired time of the past signal used as the reference signal and a current time satisfies a formula of 0.16≤Δt≤0.35, and
wherein the tire pressure decrease detection program is further configured to, when executed by the computer, cause the computer to apply the judged decrease in pressure to the vehicle to generate a report regarding the tire pressure, which eliminates an erroneous report or non-alarm and eliminates an influence of the noise superimposed on the wheel acceleration signal, to affect operation of the vehicle.

26. The non-transitory computer-readable medium of claim 25, wherein the noise removal unit functions at vehicle speed of 30 to 120 kph, and a calculation cycle of the noise removal unit is 3 to 10 msec.

27. The non-transitory computer-readable medium of claim 26, wherein the tire pressure decrease detection apparatus satisfies a formula of K×4≤N≤50, wherein N is a tap number of the FIR type adaptive digital filter and K is the number of the noise to be removed.

28. A tire pressure decrease detection apparatus comprising:
a rotation speed information detection unit for detecting rotation speed information of wheels of a vehicle;
a resonance frequency estimate unit for time-series estimating a torsional resonance frequency of the rotation speed information from the rotation speed information obtained by the rotation speed information detection unit; and
a judgment unit for judging a decrease in pressure of tires installed in the wheels based on the estimated torsional resonance frequency,
wherein the resonance frequency estimate unit includes a noise removal unit for removing a noise superimposed on a wheel speed signal serving as the rotation speed information for each of the wheels with using an active noise control technology;
wherein the active noise control technology is a Finite Impulse Response (FIR) type adaptive digital filter using a past signal of the wheel speed signal serving as an object to be controlled as a reference signal, and an LMS algorithm as an adaptive algorithm,
wherein a time difference Δt (sec) between an acquired time of the past signal used as the reference signal and a current time satisfies a formula of 0.16≤Δt≤0.35, and
wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel speed signal, to affect operation of the vehicle.

29. The tire pressure decrease detection apparatus of claim 28,
wherein a formula of K×4≤N≤50 is satisfied when a tap number of the FIR type adaptive digital filter is N and the number of the noise to be removed is K.

30. A tire pressure decrease detection apparatus comprising:
a rotation speed information detection unit for detecting rotation speed information of wheels of a vehicle;
a resonance frequency estimate unit for time-series estimating a torsional resonance frequency of the rotation speed information from the rotation speed information obtained by the rotation speed information detection unit; and
a judgment unit for judging a decrease in pressure of tires installed in the wheels based on the estimated torsional resonance frequency,
wherein the resonance frequency estimate unit includes a noise removal unit for removing a noise superimposed on a wheel speed signal serving as the rotation speed information for each of the wheels with using an active noise control technology;
wherein the active noise control technology is a Finite Impulse Response (FIR) type adaptive digital filter using a past signal of the wheel speed signal serving as an object to be controlled as a reference signal, and an LMS algorithm as an adaptive algorithm,
wherein a time difference Δt (sec) between an acquired time of the past signal used as the reference signal and a current time satisfies a formula of 0.16≤Δt≤0.35,
wherein the tire pressure decrease detection apparatus satisfies a formula of K×4≤N≤50, wherein N is a tap number of the FIR type adaptive digital filter and K is the number of the noise to be removed,
wherein the noise removal unit functions at vehicle speed of 30 to 120 kph, and a calculation cycle of the noise removal unit is 3 to 10 msec, and
wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel speed signal, to affect operation of the vehicle.

31. A tire pressure decrease detection apparatus comprising:
a rotation speed information detection unit for detecting rotation speed information of wheels of a vehicle;
a rotation acceleration information calculation unit for calculating rotation acceleration information of the wheels from the rotation speed information obtained by the rotation speed information detection unit;
a resonance frequency estimate unit for time-series estimating a torsional resonance frequency of the rotation acceleration information from the rotation acceleration information calculated by the rotation acceleration information calculation unit; and
a judgment unit for judging a decrease in pressure of the tires based on the estimated torsional resonance frequency,
wherein the resonance frequency estimate unit includes a noise removal unit for removing a noise superimposed on a wheel acceleration signal serving as the rotation acceleration information for each of the wheels with using an active noise control technology;

wherein the active noise control technology is a Finite Impulse Response (FIR) type adaptive digital filter using a past signal of the wheel acceleration signal serving as an object to be controlled as a reference signal, and an LMS algorithm as an adaptive algorithm, wherein a time difference Δt (sec) between an acquired time of the past signal used as the reference signal and a current time satisfies a formula of 0.16≤Δt≤0.35, wherein the noise removal unit functions at vehicle speed of 30 to 120 kph, and a calculation cycle of the noise removal unit is 3 to 10 msec, and wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel acceleration signal, to affect operation of the vehicle.

32. A tire pressure decrease detection apparatus comprising:
a rotation speed information detection unit for detecting rotation speed information of wheels of a vehicle;
a rotation acceleration information calculation unit for calculating rotation acceleration information of the wheels from the rotation speed information obtained by the rotation speed information detection unit;
a resonance frequency estimate unit for time-series estimating a torsional resonance frequency of the rotation acceleration information from the rotation acceleration information calculated by the rotation acceleration information calculation unit; and
a judgment unit for judging a decrease in pressure of the tires based on the estimated torsional resonance frequency, wherein the resonance frequency estimate unit includes a noise removal unit for removing a noise superimposed on a wheel acceleration signal serving as the rotation acceleration information for each of the wheels with using an active noise control technology;

wherein the active noise control technology is a Finite Impulse Response (FIR) type adaptive digital filter using a past signal of the wheel acceleration signal serving as an object to be controlled as a reference signal, and an LMS algorithm as an adaptive algorithm, wherein a time difference Δt (sec) between an acquired time of the past signal used as the reference signal and a current time satisfies a formula of 0.16≤Δt≤0.35, wherein the noise removal unit functions at vehicle speed of 30 to 120 kph, and a calculation cycle of the noise removal unit is 3 to 10 msec, wherein the tire pressure decrease detection apparatus satisfies a formula of K×4≤N≤50, wherein N is a tap number of the FIR type adaptive digital filter and K is the number of the noise to be removed, and wherein the tire pressure decrease detection apparatus is further configured to apply the judged decrease in pressure to the vehicle to generate a report regarding the tire pressure, which eliminates an erroneous report or non-alarm and eliminates an influence of the noise superimposed on the wheel acceleration signal, to affect operation of the vehicle.

* * * * *